(12) United States Patent
Conrad et al.

(10) Patent No.: US 11,663,254 B2
(45) Date of Patent: May 30, 2023

(54) SYSTEM AND ENGINE FOR SEEDED CLUSTERING OF NEWS EVENTS

(71) Applicant: Thomson Reuters Enterprise Centre GMBH, Zug (CH)

(72) Inventors: Jack G. Conrad, Eagan, MN (US); Michael J. Bender, Baar (CH)

(73) Assignee: Thomson Reuters Enterprise Centre GMBH, Zug (CH)

( * ) Notice: Subject to any disclaimer, the term of this patent is extended or adjusted under 35 U.S.C. 154(b) by 0 days.

(21) Appl. No.: 15/418,763

(22) Filed: Jan. 29, 2017

(65) Prior Publication Data

US 2017/0235820 A1 Aug. 17, 2017

Related U.S. Application Data

(60) Provisional application No. 62/288,543, filed on Jan. 29, 2016.

(51) Int. Cl.
*G06F 16/33* (2019.01)
*G06F 16/93* (2019.01)
*G06F 16/338* (2019.01)
*G06F 16/35* (2019.01)
*G06F 17/22* (2006.01)
*G06F 17/27* (2006.01)
(Continued)

(52) U.S. Cl.
CPC .......... *G06F 16/334* (2019.01); *G06F 16/338* (2019.01); *G06F 16/355* (2019.01); *G06F 16/358* (2019.01); *G06F 16/93* (2019.01); *G06F 40/194* (2020.01); *G06F 40/295* (2020.01)

(58) Field of Classification Search
CPC .......... G06F 17/30675; G06F 17/2211; G06F 17/278; G06F 17/30696; G06F 17/3071
USPC ........................................................ 707/728
See application file for complete search history.

(56) References Cited

U.S. PATENT DOCUMENTS 7,568,148 B1 * 7/2009 Bharat ..................... G06F 17/00 715/200
8,849,809 B1 * 9/2014 Seshadri ................. G06Q 10/00 707/725
9,183,285 B1 * 11/2015 Brown ................... G06F 16/285
(Continued)

*Primary Examiner* — Syed H Hasan
*Assistant Examiner* — Nicholas E Allen
(74) *Attorney, Agent, or Firm* — Duncan Galloway Greenwald PLLC; Kevin T. Duncan

(57) ABSTRACT

The present invention provides a seeded news event clustering and retrieval system configured to first create a candidate data set of documents, second create a set of initial clusters based on nearness or duplicate similarity status, and third create an aggregate cluster by merging initial clusters with seed documents. The invention generates top-level clusters for news events based on an editorially supplied topical label or "seed" component and generates sub-topic-focused clusters based on algorithm. The system uses an agglomerative clustering algorithm to gather and structure documents into distinct result sets. Decisions on whether to merge related documents or clusters are made according to similarity of evidence derived from two distinct sources, one, relying on a digital signature based on the unstructured text in the document, the other based on the presence of named entity tags that have been assigned to the document by an event or named entity tagger such as the Thomson Reuters Calais engine/web service.

22 Claims, 9 Drawing Sheets

(51) Int. Cl.
    *G06F 40/194*     (2020.01)
    *G06F 40/295*     (2020.01)

(56) References Cited

U.S. PATENT DOCUMENTS

| | | | |
|---|---|---|---|
| 2009/0070346 A1* | 3/2009 | Savona | G06F 16/35 |
| 2010/0262599 A1* | 10/2010 | Nitz | G06F 16/285 |
| | | | 707/723 |
| 2011/0167054 A1* | 7/2011 | Bailey | G06F 17/30713 |
| | | | 707/710 |
| 2012/0254188 A1* | 10/2012 | Koperski | G06F 17/30663 |
| | | | 707/740 |
| 2013/0238356 A1* | 9/2013 | Torii | G06Q 10/06 |
| | | | 705/2 |
| 2015/0294220 A1* | 10/2015 | Oreif | G06F 16/338 |
| | | | 706/12 |
| 2016/0004764 A1* | 1/2016 | Chakerian | G06F 3/04842 |
| | | | 707/737 |

* cited by examiner

```
<slugline separator="-">VOLKSWAGEN-EMISSIONS-SCANDAL/</slugline>
<headline>Volkswagen could face $18 billion penalties from EPA</headline>
<dateline>WASHINGTON/DETROIT, September 18 (Reuters)</dateline>
<by>Timothy Gardner and Bernie Woodall</by>
<creditline>Reuters</creditline>
```

SYSTEM AND ENGINE FOR SEEDED CLUSTERING OF NEWS EVENTS

RELATED APPLICATION

This application claims priority to U.S. Provisional Application 62/288,543, filed Jan. 29, 2016, and entitled Seeded Clustering of News Events for Effective Research, which patent application is hereby incorporated herein by reference in the entirety.

FIELD OF THE INVENTION

The invention relates generally to natural language processing, information extraction, information retrieval and clustering, and to text mining and more particularly to clustering news and text-based documents related to events. More specifically, the invention relates information-retrieval systems, such as those that provide news documents or other related content, to users via a graphical user interface.

BACKGROUND OF THE INVENTION

With computer-implemented word processing and mass data storage, the amount of information generated by mankind has risen dramatically and with an ever-quickening pace. As a result, there is a continuing and growing need to collect and store, identify, track, classify and catalogue, and link for retrieval and distribution this growing sea of information.

Much of the world's information or data is in the form of text, the majority of which is unstructured (without metadata or in that the substance of the content is not asymmetrical and unpredictable, i.e., prose, rather than formatted in predictable data tables). Much of this textual data is available in digital form [either originally created in this form or somehow converted to digital—by means of OCR (optical character recognition), for example] and is stored and available via the Internet or other networks. However, because most of the available text is unstructured, it is difficult to effectively handle in large volumes even when using state of the art processing capabilities. Content is outstripping the processing power needed to effectively manage and assimilate information for delivery to users. Although advances have made it possible to investigate, retrieve, extract and categorize information contained in vast repositories of documents, files, or other text "containers," systems are needed to more efficiently manage and classify the ever-growing volume of data generated daily and to more effectively deliver such information to consumers.

This proliferation of documents in electronic form has resulted in a need for tools that facilitate organization of this ever-increasing expanse of documents. One such tool is information extraction software that, typically, analyzes electronic documents written in a natural language and populates a database with information extracted from such documents. Applied against a given textual document, the process of information extraction (IE) is used to identify entities of predefined types appearing within the text and then to list them (e.g., people, companies, geographical locations, currencies, units of time, etc.). IE may also be applied to extract other words or terms or strings of words or phrases.

Content and enhanced experience providers, such as Thomson Reuters Corporation, identify, collect, analyze and process key data for use in generating content, such as news articles and reports, financial reports, scientific reports and studies, law related reports, articles, etc., for consumption by professionals and others. The delivery of such content and services may be tailored to meet the particular interests of certain professions or industries, e.g., wealth managers and advisors, fund managers, financial planners, investors, scientists, lawyers, etc. Professional services companies, like Thomson Reuters, continually develop products and services for use by subscribers, clients and other customers and with such developments distinguish their products and services over those offered by their competition.

Companies, such as Thomson Reuters—with many businesses involved in delivery of content and research tools to aid a wide variety of research and professional service providers—generate, collect and store a vast spectrum of documents, including news, from all over the world. These companies provide users with electronic access to a system of databases and research tools. Professional services providers also provide enhanced services through various techniques to augment content of documents and to streamline searching and more efficiently deliver content of interest to users. For example, Thomson Reuters structures documents by tagging them with metadata for use in internal processes and for delivery to users.

"Term" refers to single words or strings of highly-related or linked words or noun phrases. "Term extraction" (also term recognition or term mining) is a type of IE process used to identify or find and extract relevant terms from a given document, and therefore have some relevance, to the content of the document. Such activities are often referred to as "Named Entity Extraction" and "Named Entity Recognition" and "Named Entity Mining" and in connection with additional processes, e.g., Calais "Named Entity Tagging" (or more generally special noun phrase tagger) and the like. There are differences in how these activities are performed. For example, term recognition might only require setting a flag when a certain expression is identified in a text span, while term extraction would be identifying it and its boundaries and writing it out for storage in, for example, a database, noting exactly where in the text it came from. Techniques employed in term extraction may include linguistic or grammar-based techniques, natural language or pattern recognition, tagging or structuring, data visualizing and predictive formulae. For example, all names of companies mentioned in the text of a document can be identified, extracted and listed. Similarly, events (e.g., Exxon-Valdez oil spill or BP Horizon explosion), sub-events related to events (e.g., cleanup effort associated with Exxon Valdez oil spill or BP Horizon explosion), names of people, products, countries, organizations, geographic locations, etc., are additional examples of "event" or "entity" type terms that are identified and may be included in a list or in database records. This IE process may be referred to as "event or entity extraction" or "event or entity recognition." As implemented, known IE systems may operate in terms of "entity" recognition and extraction wherein "events" are considered a type of entity and are treated as an entity along with individuals, companies, industries, governmental entities, etc.

There are a variety of methods available for automatic event or entity extraction, including linguistic or semantic processors to identify, based on known terms or applied syntax, likely noun phrases. Filtering may be applied to discern true events or entities from unlikely events or entities. The output of the IE process is a list of events or entities of each type and may include pointers to all occurrences or locations of each event and/or entity in the text from which the terms were extracted. The IE process may or may not rank the events/entities, process to determine which events/entities are more "central" or "relevant" to the text or document, compare terms against a collection of documents or "corpus" to further determine relevancy of the term to the document.

Thomson Reuters' Text Metadata Services group ("TMS") formerly known as ClearForest prior to acquisition in 2007, is one exemplary IE-based solution provider offering text analytics software used to "tag," or categorize, unstructured information and to extract facts about people, organizations, places or other details from news articles, Web pages and other documents. TMS's Calais is a web service that includes the ability to extract entities such as company, person or industry terms along with some basic facts and events. OpenCalais is an open source community tool to foster development around the Calais web service. APIs (Application Programming Interfaces) are provided around an open rule development platform to foster development of extraction modules. Other providers include Autonomy Corp., Nstein and Inxight. Examples of Information Extraction software in addition to OpenCalais include: AlchemyAPI; CRF++; LingPipe; TermExtractor; TermFinder; and TextRunner. IE may be a separate process or a component or part of a larger process or application, such as business intelligence software. For instance, IBM has a business intelligence solution, Intelligent Miner For Text, that includes an information extraction function which extracts terms from unstructured text. Additional functional features include clustering, summarization, and categorization. These functions analyze, for example, data accessible online or stored in traditional files, relational databases, flat files, and data warehouses or marts. Additional functions may include statistical analysis and mining techniques such as factor analysis, linear regression, principal component analysis, univariate curve fitting, univariate statistics, bivariate statistics, and logistic regression.

The present invention may be used in many applications including, but not limited to, retrieval and search applications. As used herein query and retrieval expression are terms given broad meaning to include formal search query constructs as well as internal terms or strings used to elicit responsive result sets in search, retrieval and other systems involving the clustering of news content around an identified event of interest. For example, search engines retrieve documents in response to search terms. To this end, search engines may compare the frequency of terms that appear in one document against the frequency of those terms as they appear in other documents within the collection or corpus. This aids the search engine in determining respective "importance" of the different terms within the document, and thus determining the best matching documents with respect to the given query. Two well-known techniques used in determining document relevance to terms are "term frequency" and "inverse document frequency." By using these approaches, one can determine whether to include (or not include) and in which order to rank documents satisfying a minimum relevance level. Term frequency (tf) essentially represents the number of times a term occurs in a document and inverse document frequency (idf) essentially reduces the weight or importance of terms that occur very frequently across a document collection and increases the weight or importance of those terms that occur infrequently. Idf essentially represents the inverse of the frequency of a term in the documents present in the document collection.

One widely used method for weighting terms appearing in a document against a collection of documents is called Term Frequency-Inverse Document Frequency (tf-idf)—essentially combining tf and idf techniques. Often, a two-prong normalization is provided in which: 1) rather than using absolute term counts (tf), relative frequencies are used and may be normalized to document length across a document set; and 2) idf is normalized across a document set or corpus. More specifically, tf-idf assigns a weight as a statistical measure used to evaluate the importance of a word to a document in a collection or corpus of documents. The relative "importance" of the term or word increases proportionally to the number of times or "frequency" such term or word appears in the document. The relative importance is offset by the frequency of that term or word appearing in documents comprising the corpus.

In one exemplary manner, tf as a statistic of the number of times a query term (t) appears in a document (d) may be represented as a raw function of the number of times (frequency) the term appears in a document, tf=f(t,d), or weighted in one of several known manners, e.g., log normalization, double normalization 0.5, or double normalization K, see http://en.wikipedia.org/wiki/Tf-idf. In exemplary Equation (1), application of log normalization results in tf=f(t,d)=1+log $f_{t,d}$.

The idf statistic is expressed as the $\log(N/n_t)$ (or alternatively to account for the instance of query term t not appearing in any document d of the corpus D as the $\log(N/(1+n_t))$, where t is the query term, N is the number of documents in the corpus (D) or collection (N=|D|); and $n_t$ is the number of documents d containing query term t in the corpus D or otherwise stated as |{d∈D:t∈d}|.

The combined statistic tf-idf may then be expressed in smoothed expression as:

$$\text{tf-idf}(t,d,D)=\text{tf}(t,d)\cdot\text{idf}(t,D)=(1+\log f_{t,d})\cdot\log(N/(1+n_t)). \quad \text{(Eq. 1)}$$

In addition, variations of useful weighting schemes based on tf-idf are well known in the art and are typically used by search engines as a way to score and rank a document's relevance given a user query. Generally, for each term included in a user query, the document may be ranked by relevance based on summing the scores associated with each term. The documents responsive to the user query may be ranked and presented to the user based on relevance as well as other determining factors.

Advances in technology, including database mining and management, search engines, linguistic analysis and modeling, provide increasingly sophisticated approaches to searching and processing vast amounts of data and documents, e.g., database of news articles, financial reports, blogs, SEC and other required corporate disclosures, legal decisions, statutes, laws, and regulations, that may affect business performance, including pricing and availability of commodities. Investment and other financial professionals and other users increasingly rely on mathematical models and algorithms in making professional and business determinations. Especially in the area of investing, systems that provide faster access to and processing of (accurate) news and other information related to corporate operations performance will be highly-valued tools of the professional and will lead to more informed, and more successful, decision making. Information technology and in particular information extraction (IE) are areas experiencing significant growth to assist interested parties to harness the vast amounts of information accessible through pay-for-services or freely available such as via the Internet.

Many financial services providers use "news analysis" or "news analytics," which refer to a broad field encompassing and related to information retrieval, machine learning, statistical learning theory, network theory, and collaborative filtering, to provide enhanced services to subscribers and customers. News analytics includes the set of techniques, formulas, and statistics and related tools and metrics used to digest, summarize, classify and otherwise analyze sources of information, often public "news" information. An exemplary use of news analytics is a system that digests, i.e., reads and classifies, financial information to determine market impact related to such information while normalizing the data for other effects. News analysis refers to measuring and analyzing various qualitative and quantitative attributes of textual news stories, such as that appear in formal text-based articles and in less formal delivery such as blogs and other online vehicles. More particularly, the present invention concerns analysis in the context of electronic content. Expressing, or representing, news stories as numerical indexes or other data points enables systems to transform traditional information expressions into more readily analyzable mathematical and statistical expressions and further into useful data structures and other work products. News analysis techniques and metrics may be used in the context of determining similarity between entities. Services provide this information in the form of a service input.

There are known services providing preprocessing of data, entity extraction, entity linking, indexing of data, and for indexing ontologies that may be used as preprocessing in identifying relationships between entities and events, e.g., for use in agglomerative clustering services associated with the present invention as discussed below. For example:

U.S. Pat. No. 7,333,966, entitled "Systems, Methods, And Software For Hyperlinking Names"

U.S. Pat. Pub. 2009/0198678, entitled "Systems, Methods, And Software For Entity Relationship Resolution";

U.S. Pat. No. 8,321,398, entitled "Method And System For Determining Relevance of Terms in Text Documents";

U.S. Pat. Pub. 2011/0119576, entitled "Method And System For Redacting And Presenting Documents", U.S. Pat. Pub. 2009/0327115, entitled "Financial Event And Relationship Extraction";

U.S. Pat. No. 9,501,467, entitled "Entity, Event, And Relationship Extraction", U.S. Pat. No. 9,292,545, entitled "Entity Fingerprints"; and U.S. Pat. No. 9,529,795, entitled "Systems And Methods For Natural Language Generation";

the contents of each of which are incorporated by reference herein in their entirety, describe systems, methods and software for the preprocessing of data, content/event/entity extraction, content/event/entity linking, indexing of data, and for indexing ontologies in addition to linguistic and other techniques for mining or extracting information from documents and sources. In addition, the inventors have been involved in prior efforts related to clustering in connection with information retrieval systems including:

U.S. Pat. No. 9,367,604, entitled "Systems, Methods, And Interfaces For Extending Legal Search Results"; and U.S. Pat. No. 9,177,050, entitled "Systems, Methods, And Interfaces For Extending Legal Search Results";

both of which are hereby incorporated by reference herein in the entirety.

One problem recognized by the present inventors is that such Information Retrieval systems are document-centric designed to return a list of relevant documents based on a query or set of search terms and may be ranked in order of closeness to those terms. The returned set of documents while relevant may be unfocused or ineffective for delivering results in a format easily understood or examinable by the user. In addition, such document-centric searches conducted against news or other databases frequently provide results that include duplicate documents—that is, documents that are completely or substantially identical to each other. The problem stems from news providers, such as Associated Press (AP), selling their news stories for re-publication to multiple publishers around the world. This in turn means that systems that provide users searchable access to collections of news stories from a wide array of publishers typically present users with many duplicate copies of news stories in their search results. Often the duplicate stories are mixed based on relevance with other distinct stories, leaving users to manually manage the complexities of identifying and/or filtering them. One known system described in:

U.S. Pat. No. 7,809,695 entitled "Information Retrieval Systems With Duplicate Document Detection And Presentation Functions";

which is hereby incorporated herein by reference in the entirety, provides a means to identify and avoid problems of duplicate articles cluttering or obscuring search results.

Accordingly, the present inventors recognized a need to effectively address the problems associated with document-centric information-retrieval systems, such as news feed-related systems, and to deliver information in an event-centric manner that also avoids cluttered duplicate search results delivered to users. There is also a need to organize, tag and present the event-centric results in a clustered fashion more easily reviewed and scrutinized by users.

SUMMARY OF THE INVENTION

The presentation of news articles to meet research needs has traditionally been a document-centric or simply entity-centric (company, person, etc.) process. However, many times users prefer to monitor developing news stories based on the evolving event itself, rather than through the examination of an exhaustive list of retrieved documents. The present invention is herein illustrated and described in the context of a news retrieval system and an underlying algorithm which is event-centric rather than document-centric.

The system of the present invention clusters news articles around a single news event or an event and its sub-events. In one semi-supervised version, the present invention can leverage the existence of news story lines and, in the case of Thomson Reuters, its event labels (also known as 'sluglines') as seed documents for the clustering process. Other and additional tagging information, such as generated by Thomson Reuters' Calais tagging engine's automatic identification/assignment of tags, may be leveraged in processing documents. The system of the present invention is configured to generate top-level clusters for news events based on an editorially supplied topical label and then generate sub-topic-focused clusters or second level clusters based on its algorithm. The system uses an agglomerative clustering algorithm to gather and structure documents into distinct result sets or clusters. Decisions on whether to merge related documents or clusters are made according to similarity of evidence derived from two distinct sources, one, relying on a digital signature based on the unstructured text in the document, the other based on the presence of named entity tags that have been assigned to the document by an event or named entity tagger such as the Thomson Reuters' Calais engine.

The invention provides an event-centric model for organizing and rendering articles found in a news repository as an alternative paradigm to known document-centric approaches. In connection with the present invention, "document" means documents, articles, textual content, abstracts, excerpts, snubs, templates, reports, records, summaries and other content bearing files. Whether users are editors, financial analysts, lawyers or other professional researchers, the invention provides a more effective means of examining a set of event-related news articles beyond that of a ranked list of documents. The presentation of news articles based on events aligns well with contemporary research use cases, such as those arising in the finance and risk sectors, where there is a salient need for more effectively organized news content through the lens of events.

The invention may also include semi-supervised clustering capabilities to structure news documents based upon identified commonality of news events. Editorial identifiers or labels present in germinal stories, e.g., Thomson Reuters stories with event labels (e.g., sluglines) serve as "seed" documents for topical news event organization. The assigned event label is metadata associated with the first or seminal document written concerning an event. The event label serves as a unifying topical "stamp" and is carried forward on subsequent versions of that initial document as well as later documents related to the event, as well as sub-events, first explored in the seed document. In this beneficial manner, a company, such as Thomson Reuters, can leverage its unifying tags or labels or topical identifiers as a basis for grouping news articles consisting of not only Thomson Reuters articles but also third-party news content. In addition to event labels or "sluglines," other tagging operations, e.g., Calais tagging engine, may be performed on unstructured documents, both internal (e.g., Reuters generated documents) and external (non-Reuters generated documents) to an organization. In keeping with the invention, the germinal event labels provide a means to organize top-level "event" clusters (e.g., Ukraine crisis) and the invention uses algorithmic means to organize lower-level "sub-event" clusters (e.g., Ukraine crises/airline crash) and fold in third-party content.

By having subject matter experts (SMEs), such as journalists and editors, create/assign event labels the clustering system of the present invention provides a semi-supervised system that combines professional expertise with automated duplication identification/digital signature processes and clustering processes. The resulting seeded clustering of documents is more effective than purely machine-based systems while having the speed and efficiency associated with sophisticated computer-based systems.

In a first embodiment, the present invention provides a computer-based system connected via a communications network to a plurality of news content sources, the system comprising: a news repository database comprising a primary set of documents and a secondary set of documents, each of the primary set of documents having a predefined event label; a digital communications interface having an input and an output, the input adapted to retrieve information from the news repository database and receive an input retrieval expression or query; an event clustering engine adapted to cluster documents about an event and comprising: a data set creation module adapted to load a set of documents for potential news event clustering into a candidate data set, the candidate data set including documents from both the primary set of documents and the secondary set of documents; an initial cluster module adapted to compare digital signature metadata related to the candidate data set and to cluster a set of documents from the candidate data set to form an initial cluster, the initial cluster module adapted to form a plurality of initial clusters; and an aggregate cluster module adapted to execute an algorithmic similarity function to measure similarity between features related to initial clusters formed by the initial cluster module, the aggregate cluster module further adapted to merge in whole or in part one or more initial clusters to form an aggregate cluster about a seed document from the primary set of documents based on measured similarity; and a retrieval engine comprising: an event identification module adapted to identify an event of interest related to a received input retrieval expression; and a match module adapted to match the identified event of interest with one or more aggregate clusters; wherein the output of the digital communications interface is adapted to output for display at a computing device a representation of an aggregated cluster in response to the received input retrieval expression.

In addition, the system of the first embodiment may be further characterized by one or more of the following: a graphic user interface adapted to present a graphic representation of the aggregated cluster set of documents via a display associated with the computing device; wherein the data set creation module comprises a recommendation classifier adapted to discriminate among documents to arrive at the candidate data set based on a set of criteria; wherein the aggregate cluster module adapted to execute an algorithmic similarity function to measure similarity between features, the features related to initial clusters includes a set of digital signatures; wherein the initial clustering module is adapted to apply heuristic processes based on a set of features to first reduce the number of digital signatures compared in arriving at the initial cluster of document records; wherein the data set creation module is further adapted to populate a candidate data set table, the initial cluster module is further adapted to populate an initial cluster table, and the aggregate cluster module is further adapted to populate an aggregate cluster table, wherein the aggregate cluster module applies an algorithm representing a set of document features stored in the initial cluster table to determine merging of initial clusters from the plurality of initial clusters into the aggregate cluster and storing data related to the aggregate cluster into the aggregate cluster table; wherein the aggregate cluster module determines merging of clusters from the initial cluster set based on a determined similarity between two or more of: unstructured text contained in content received from the candidate data set; tagged entity names appearing in the candidate data set; and digital signatures derived from unstructured text contained in content from the candidate data set; wherein the aggregate cluster module determines merging of clusters by analyzing data structures represented in vector form; wherein a first vector representation of a digital signature associated with the unstructured text of a document is term-based and is used to determine a degree of overlap between two document representatives of their clusters and a second vector is tag-based and is associated with the structured text of a document in the cluster and is used to determine a degree of overlap between two document representatives of their clusters; wherein the output of the digital communications interface is adapted to output for display at the computing device a graphical representation of an aggregated cluster.

In a second embodiment the present invention provides a computer-based system connected via a communications network to a plurality of news content sources, the system comprising: a news repository database comprising a primary set of documents and a secondary set of documents, each of the primary set of documents having a predefined event label; a digital communications interface having an input and an output, the input adapted to retrieve information from the news repository database; an event clustering engine adapted to cluster documents from the news repository database about an event, the event clustering engine comprising: a data set creation module adapted to load a set of documents for potential news event clustering into a candidate data set, the candidate data set including documents from both the primary set of documents and the secondary set of documents; an initial cluster module adapted to compare digital signature data related to the candidate data set and to cluster a set of documents from the candidate data set to form an initial cluster, the initial cluster module adapted to form a plurality of initial clusters; and an aggregate cluster module adapted to execute an algorithmic similarity function to measure similarity between features related to initial clusters formed by the initial cluster module, the aggregate cluster module further adapted to merge in whole or in part, based on measured similarity, one or more initial clusters to form an aggregate cluster about a seed document from the primary set of documents; and wherein the output of the digital communications interface is adapted to output a signal related to one or more aggregate clusters.

The aggregate or agglomerative clustering technique using a seed document/event label as described herein together with the combination of a three-stage approach to clustering represent significant advancements of the art in providing an alternative, event-centric framework for delivering clustered news documents about an event of interest and is described in greater detail herein below.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention, but are intended to be exemplary and for reference.

FIG. 3A is an exemplary XML tag that represents an event label in accordance with the present invention.

DETAILED DESCRIPTION OF THE INVENTION

Figure 1:
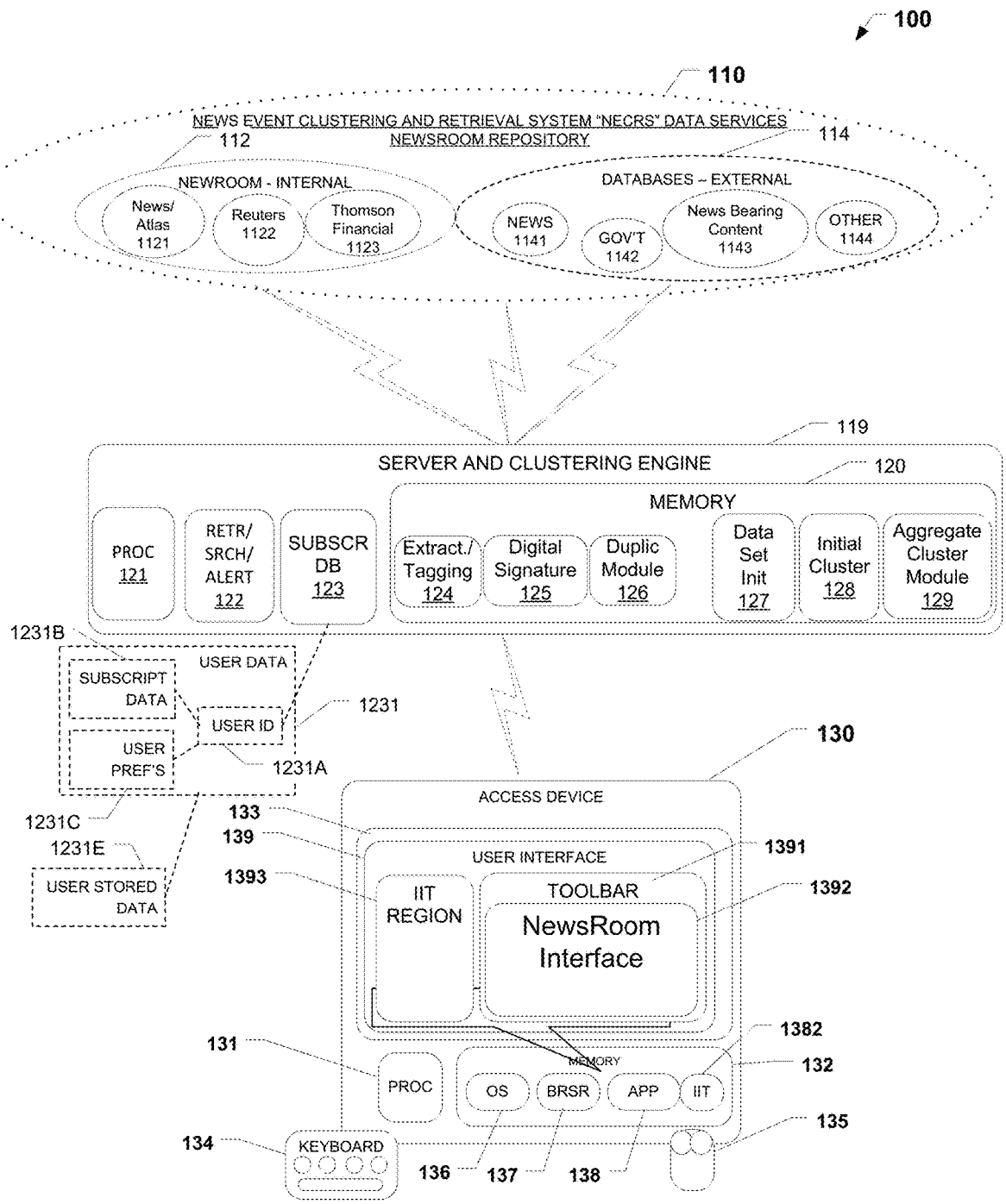
FIG. 1 is a schematic diagram illustrating an exemplary computer-based system for implementing the multi-stage News Events Clustering and Retrieval System ("NEC-RS") of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In accordance with the present invention, a multi-stage process is employed for delivering event-centric search results to users via online news delivery services. The multi-stage system includes: i) content extraction/dataset creation; ii) localized or duplicate document clustering around a seed document; and iii) algorithmic lower-level clustering involving merging of local seeded clusters. In one manner, there are three stages involved in processing and clustering a large set of news documents around news events. The term "cluster" as used herein refers equally to one or more documents. As described in more detail with reference to figures herein below, the stages include: (1) candidate data set creation—extracting documents from a news repository and establishing a working dataset; (2) initial clustering—performing "online" or local clustering to group similar articles using duplicate document detection for identical and fuzzy duplicates (we refer to and incorporate the deduplication processes disclosed in U.S. Pat. No. 7,809, 695); and (3) aggregate or agglomerative clustering (and in an offline process may be referred to as "batch" clustering) over the resulting initial clusters of the candidate data set produced by the second stage. In this manner, the online or initial clustering stage provides an effective and highly reliable solution. The final aggregate clustering stage is described in detail herein below and the following papers provide support for the efficacy of the approach:

Jack G. Conrad, Xi S. Guo, and Cindy P. Schriber "Online Duplicate Document Detection: Signature Reliability in a Dynamic Retrieval Environment," In *Proceedings of the 2003 ACM-CIKM Twelfth International Conference on Information and Knowledge Management (CIKM03)* (New Orleans, La.), ACM Press, New York, pp. 243-252, 2003.

Jack G. Conrad and Cindy P. Schriber, "Managing Déjà Vu: Collection Building for Identifying Non-Identical Duplicate Documents," *Journal of the American Society for Information Science and Technology* (JASIST), 57(7), John Wiley & Sons, Hoboken, N.J., pp. 919-930, 2006.

Jack G. Conrad and Edward L. Raymond, Jr., "Essential Deduplication Functions for Transactional Databases in Law Firms," In *Proceedings of the 11th International Conference on Artificial Intelligence and Law (ICAIL 2007)* (Stanford University, Palo Alto, Calif.), ACM Press, New York, pp. 261-270, 2007.

As described herein, internal documents refer to documents "internal" or owned by a company (Company), e.g., Thomson Reuters generated documents/content, and "third-party content" is non-Company documents/content. Reference is made to Thomson Reuters' SME-generated and assigned "event labels" as a way to label articles generated by its businesses. Event label is a term used more generally to include Thomson Reuters sluglines and the like but also to include such event labels generated by other companies as a way to organize documents and repositories. Thus, not only Thomson Reuters but other companies involved in similar endeavors will appreciate the benefit to grouping news articles together, i.e., articles consisting of internal Company documents and third-party content.

One key objective of the invention is to provide an alternative, event-centric news paradigm that solves the challenges of event validation and event story clustering at scale. The present invention uses semi-supervised clustering capabilities in order to group news documents based upon shared or common news events. For example, germinal Reuters stories with editorially (SME—subject matter expert) assigned "event labels" as tags in metadata (e.g., referred to as "slugline" in the case of some Thomson Reuters documents) are used as seed documents for event identification and organization. In addition to organizing news results around events rather than documents, the invention provides an effective mechanism for clustering internal as well as third-party news documents with and based on corresponding seminal or germinal in-house, e.g., Thomson Reuters-generated, articles assigned an "event label," e.g., slugline. In this manner documents from a variety of sources may be preprocessed and clustered around common news events. The process is aided by leveraging metadata tags assigned to unstructured internal and third-party sources, e.g., by way of Thomson Reuters' Calais tagging engine/service. These metadata tags and document features, including digital signatures, are used in two manners, first to identify duplicate documents in the "local" or initial clustering stage, and second to determine similarity for aggregated clustering tagged internal news documents and third-party content documents around a seed document in the aggregate clustering stage.

Figure 3B:
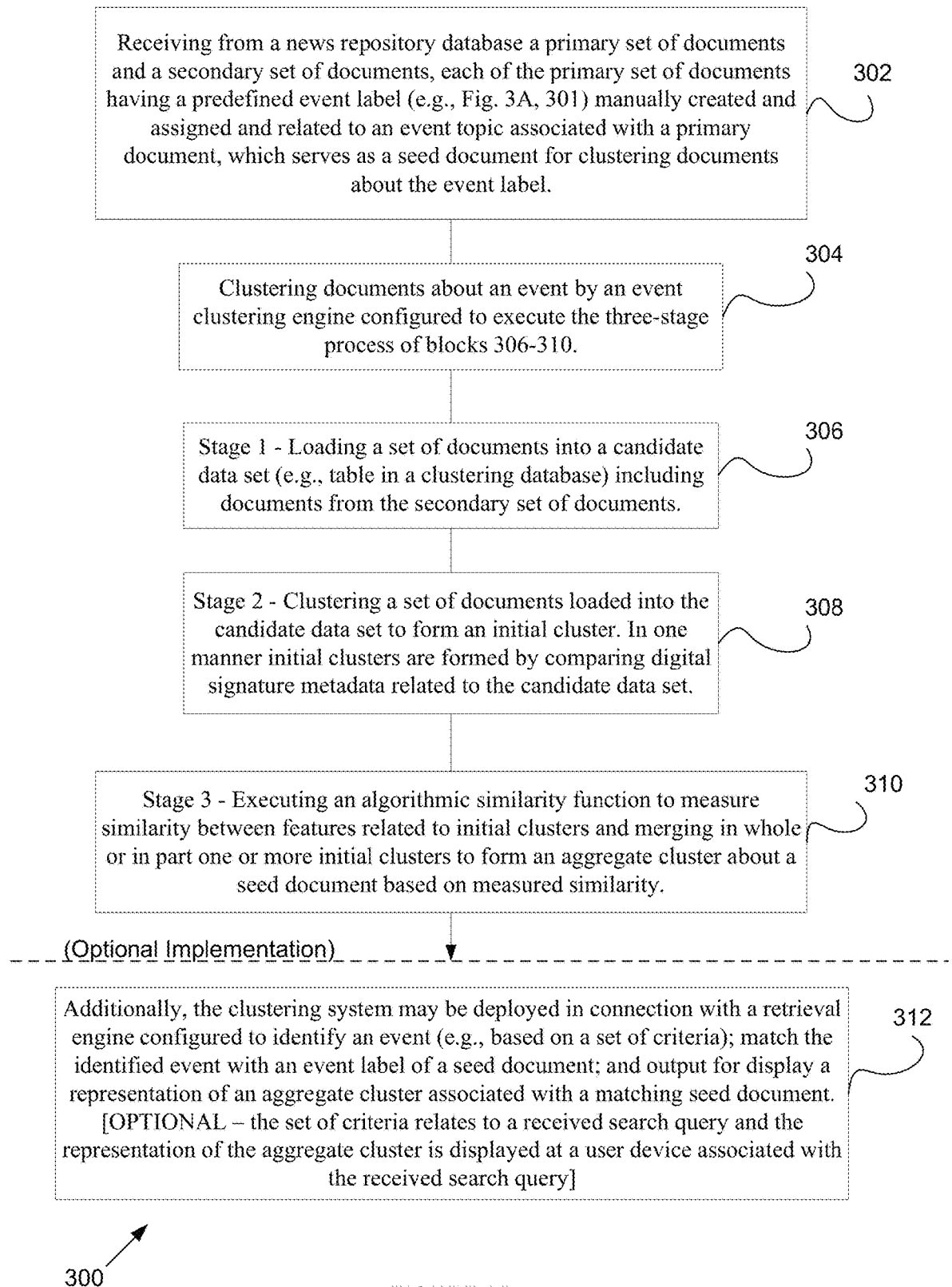
FIG. 3B is a flow chart illustrating an exemplary implementation of the NEC-RS system of the present invention.

FIG. 3A is an exemplary event label 301 created and assigned by a subject matter expert to a document using a markup language to create tags, e.g., XML tags, separate from the text of an article. The XML tag 301 serves as an event label for use of the related document as a seed document in the present invention. FIG. 3B illustrates the clustering process 302-310, described in detail below, in which an event label, such as event label 301, is used in connection with a seed document. In this manner, a company can use the initial or top-level story labels (e.g., VOLKSWAGEN-EMISSION-FRAUD/) as an organizing principle for top-level clusters, and an algorithmic means for creating lower-level clusters which can incorporate second-tier story labels (e.g., VOLKSWAGEN-EMISSION-FRAUD/COMPENSATION).

Event labels, or as often referred to as sluglines or slugline tags, are distinct from headlines and are "objects" that qualify to label cluster "seed" documents. As described below in connection with the clustering processes, the seed articles with event labels may be singletons or they may exist in one of the initial clusters formed in a preceding stage.

Figure 2:
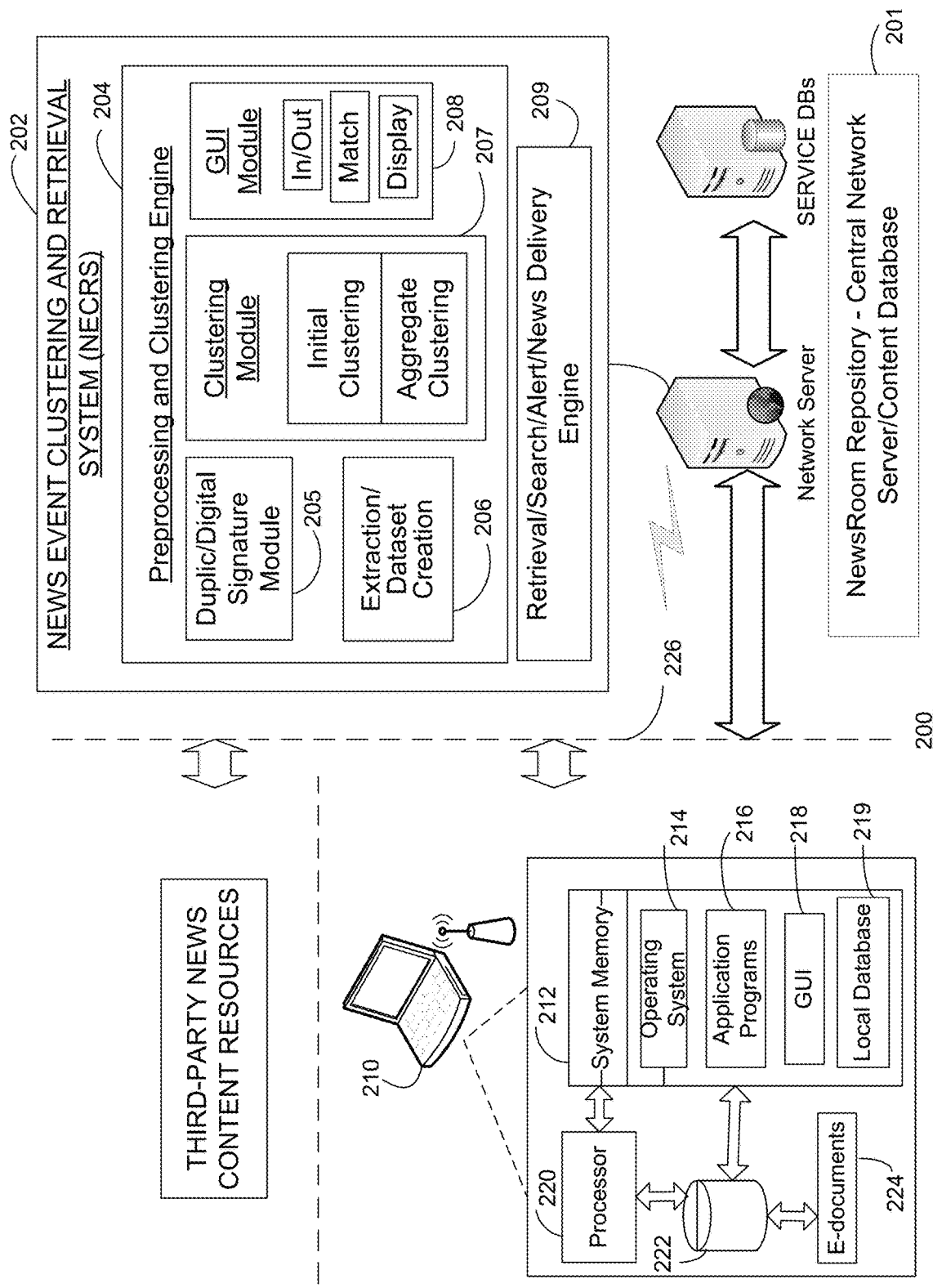
FIG. 2 is a schematic diagram illustrating an exemplary computer-based system for implementing the present invention NEC-RS system.

FIGS. 1 and 2 illustrate exemplary embodiments of an overall architecture for use in accordance with the multi-stage News Events Clustering and Retrieval System ("NEC-RS") of the present invention. FIGS. 1 and 2 are schematic diagrams of a client/server/database architecture associated with an exemplary implementation of the NEC-RS and are used to facilitate description of the invention but are not limiting to the scope of the invention. Those possessing ordinary skill in the art of the field of the invention will appreciate the beneficial use of the invention in a variety of implementations including a variety of engine and database and server configurations. For example, the NEC-RS of the present invention may be used in a variety of systems designed to provide news services to clients, users, customers, professionals, subscribers, systems, including in connection with, for example, search and retrieval, alert, trend, and archival processes.

Now with reference to FIG. 1, an exemplary embodiment of an architecture for implementing the present invention is illustrated in conjunction with a multi-stage News Events Clustering and Retrieval System ("NEC-RS") 100 for preparing documents for delivery to users. NEC-RS system 100 includes a NewsRoom Repository 110, which may be in the form of one or more databases 112, 114, Server and Clustering Engine 119, which is capable of electronic communication with an access device 130. The Server and Clustering Engine ("SCE") 119 accesses information from NewsRoom Repository 110 for processing and may be used to deliver content to access device 130 over an electrical communication network. NEC-RS system 100 is adapted to automatically collect and process internal and external sources of information (112, 114) relevant in collecting news content for clustering about an identified event of interest so as to deliver event-centric content for use by recipients. SCE 119 is in electrical communication with NewsRoom Repository 110, e.g., over one or more or a combination of Internet, Ethernet, fiber optic or other suitable communication means. SCE 119 includes a processor 121 and a memory 120, in which is stored executable code and data, and includes a Retrieval/Search/Alert Engine 122 and a subscriber database 123.

Stored in a memory 120 for processing are a set of core functions including tagging module 124, digital signature module 125 and duplication identification module 126. These core functions may be called by or otherwise used in connection with one or more of the three primary clustering processes—Data Set Creation Stage 1 module 127, Initial Clustering Stage 2 module 128, and Aggregate Clustering Stage 3 module 129. The various modules 124-129 are described in detail herein below. Processor 121 includes one or more local or distributed processors, controllers, or virtual machines. Non-transitory memory 120, which takes the exemplary form of one or more electronic, magnetic, or optical data-storage devices, stores non-transitory machine readable and/or executable instruction sets for wholly or partly defining software and related user interfaces for execution of the processor 121 of the various data and modules 124-129.

Quantitative analysis, regression models, machine language training and sequence tagging models, classifier tagging models, Bayesian models, techniques or mathematics and models associated with modules 124 to 129 used in conjunction with computer science processes are performed by SCE 119. This operation renders SCE 119 as a special purpose computing machine that transforms raw data and/or structured data and metadata retrieved and processed from the NewsRoom Repository 110, and other information, into aggregate clusters of news content for use by analysts, financial professionals, lawyers, clients, and other users. In this manner, the special purpose SCE 119 allows users to more efficiently understand news content centered around events of interest. This efficient collection and distribution of news content enables recipients of the deliverable to make decisions regarding financial activity, legal activity, business activity, or other related services.

The NEC-RS system 100 may be implemented in a variety of deployments and architectures. NEC-RS data can be delivered as a deployed solution at a customer or client site, e.g., within the context of an enterprise structure, via a web-based hosting solution(s) or central server, or through a dedicated service. FIG. 1 shows one embodiment of the NEC-RS as comprising an online client-server-based system adapted to integrate with either or both of a central service provider system or a client-operated processing system, e.g., one or more access or client devices 130. In this exemplary embodiment, NEC-RS system 100 includes at least one web server that can automatically control one or more aspects of an application on a client access device, which may run an application augmented with an add-on framework that integrates into a graphical user interface or browser control to facilitate interfacing with one or more web-based applications.

Subscriber database 123 includes subscriber-related data for controlling, administering, and managing pay-as-you-go or subscription-based access of databases 110 or the NEC-RS service. In the exemplary embodiment, subscriber database 123 includes user data as data structures 1231, including user identification data 1231A, user subscription data 1231B, and user preferences 1231C and may further include user stored data 1231E. In the exemplary embodiment, one or more aspects of the user data structure relate to user customization of various search and interface options. For example, user ID 1231A may include user login and screen name information associated with a user having a subscription to the services accessed and distributed via NEC-RS system 100.

Access device 130, such as a client device, may take the form of a personal computer, workstation, personal digital assistant, mobile telephone, or any other device capable of providing an effective user interface with a server or database. Specifically, access device 130 includes a processor module 131 including one or more processors (or processing circuits), a memory 132, a display 133, a keyboard 134, and a graphical pointer or selector 134. Processor module 131 includes one or more processors, processing circuits, or controllers. Memory 132 stores code (machine-readable or executable instructions) for an operating system 136, a browser 137, client-side clustering application software 138, and user interface tools 1382. In the exemplary embodiment, operating system 136 may take the form of a version of the Microsoft Windows, Apple Macintosh, Linux or other suitable operating system, and browser 137 may take the form of a version of Microsoft Internet Explorer, Google Chrome, Firefox or other suitable browser. Operating system 136 and browser 137 not only receive inputs from keyboard 134 and selector 135, but also support rendering of graphical user interfaces 139 on display 133. Upon launching processing software an integrated NEC-RS graphical-user interface 139 is defined in memory 132 and rendered on display 133. Upon rendering, interface 139 presents data in association with one or more interactive control features such as user interface tools region 1393, toolbar 1391, and NEC-RS interface 1392, e.g., NewsRoom. The interface 1392 may incorporate, comprise, or consist of a variety of existing software solutions or GUIs.

In one embodiment of operating a system in accordance with the NEC-RS 100 present invention, an add-on framework is installed and one or more tools or APIs on SCE 119 are loaded onto one or more client devices 130. In the exemplary embodiment, this entails a user directing a browser in a client access device, such as access device 130, to Internet-Protocol (IP) address for an online information-retrieval system, such as offerings from Thomson Reuters, Thomson Financial, Reuters Services, Thomson Reuters Eikon service, Westlaw and other systems, and then logging onto the system using a username and/or password. Successful login results in a web-based interface being output from SCE 119, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server, such as one operated by a financial services customer, may receive one or more of the framework, tools, APIs, and add-on software for loading onto one or more client devices 130 using internal processes.

Once installed in whatever fashion, a user may then be presented an online tools interface in context with a document-processing application. Add-on software for one or more applications may be simultaneously invoked. An add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on SCE 119, which in turn may provide dynamic scripting and control of the host application using one or more APIs stored on the host application as part of the add-on framework.

With reference to FIG. 2, the above processes, and as discussed in more detail below, may be carried out in conjunction with the combination of hardware and software and communications networking illustrated in the form of exemplary NEC-RS system 202 as implemented in an overall news content collection and distribution network 200. In this example, NEC-RS system 202 provides a framework for collecting news content from internal and external sources, screening (recommending) and preprocessing news content, clustering news content around events by using SME assigned event labels, and delivering news content clustered around identified events in a new paradigm as a beneficial alternative to prior document-centric retrieval systems. For example, NEC-RS system 202 may be used in conjunction with a system offering of a professional services provider, e.g., Eikon, a product and service of Thomson Reuters Finance and Risk, and in this example includes a NewsRoom Repository—Central Network Server/Database Facility 201 comprising databases, e.g., those shown in NewsRoom Repository 110 in FIG. 1, and other publicly and privately available services. NEC-RS 202 includes a Preprocessing and Clustering Engine 204 having as components a Duplication Identification/Digital Signature Module 205, an Extraction and Data Set Creation Module 206, a Clustering Module 207, and a Graphical User Interface Module 208. NEC-RS 202 also includes a Retrieval/Search/Alert/News Delivery engine 209.

In addition, the NEC-RS system 202 may include a graphic user interface adapted to present a graphic representation of an aggregated cluster set of documents via a display associated with a remote computing device. Also, in stage one, the data set creation module may include a recommendation classifier adapted to discriminate among documents to arrive at the candidate data set based on a set of criteria. Also, in stage three, the aggregate cluster module executes an algorithmic similarity function to measure similarity between features associated with the candidate data set. The features related to initial clusters may include a set of digital signatures. Moreover, the initial or local clustering module may be adapted to apply heuristic processes based on a set of features to first reduce the number of digital signatures compared in arriving at the initial cluster.

In one exemplary manner of operation, the data set creation module may be further adapted to populate a candidate data set table, the initial cluster module may be adapted to populate an initial cluster table, and the aggregate cluster module may be adapted to populate an aggregate cluster table. Further, the aggregate cluster module is adapted to apply an algorithm representing a set of document features stored in the initial cluster table to determine merging of initial clusters from the plurality of initial clusters into the aggregate cluster. Data related to the aggregate cluster may be stored into the aggregate table. In addition, the aggregate cluster module may be adapted to determine merging of clusters from the initial cluster set based on a determined similarity between two or more of: unstructured text contained in content received from the candidate data set; tagged entity names appearing in the candidate data set; and digital signatures derived from unstructured text contained in content from the candidate data set. In an exemplary manner of operation, the aggregate cluster module determines merging of clusters by analyzing data structures represented in vector form, wherein a first vector representation of a digital signature is term-based and is used to determine a degree of overlap between two clusters and a second vector is tag-based based on the set of tags associated with the documents in the cluster and is used to determine a degree of overlap between two clusters. The output of the digital communications interface is adapted to output for display at the computing device a graphical representation of an aggregated cluster created in one of the several manners described herein.

The NewsRoom Central Facility 201 may be accessed by remote users operating computing devices 210, such as via a network 226, e.g., Internet. Aspects of the news content collection and distribution network 200 may be enabled using any combination of Internet or (World Wide) WEB-based, desktop-based, or application WEB-enabled components. The remote user system in this example includes a GUI interface operated via a computer 210, such as a PC computer or the like, that may comprise a combination of hardware and software including, as shown in respect to computer 210, system memory 212, operating system 214, application programs 216, graphical user interface (GUI) 218, local database 219, processor 220, and storage 222 which may contain electronic information 224 such as electronic documents. The methods and systems of the present invention, described in detail hereafter, may be employed in providing remote users access to a searchable database.

Client-side application software may be stored on a machine-readable medium and comprise instructions executed, for example, by the processor 220 of computer 210, and presentation of web-based interface screens facilitate the interaction between user system 209 and central system 201. The operating system 214 should be suitable for use with the system 201 and browser functionality described herein, for example, Microsoft Windows operating systems commonly available and widely distributed. The system may require the remote user or client machines to be compatible with minimum threshold levels of processing capabilities, minimal memory levels and other parameters.

The configuration thus described in this example is one of many and is not limiting as to the invention. Central system 201 may include a network of servers, computers and databases, such as over a LAN, WLAN, Ethernet, token ring, FDDI ring, ISDN, X.25, DSL, and ATM type networks or other communications network infrastructure. Software to perform functions associated with system 201 may include self-contained applications within a desktop or server or network environment and may utilize local databases, such as SQL, IBM or other suitable databases, to store documents, collections, and data associated with processing such information. In the exemplary embodiments the various databases may include a relational database. In the case of relational databases, various tables of data are created and data is inserted into, and/or selected from, these tables using SQL, or some other database-query language known in the art. In the case of a database using tables and SQL, a database application such as, for example, MySQL™, SQL-Server™, Oracle 8I™, 10G™, Apache Derby or some other suitable database application may be used to manage the data. These tables may be organized into an RDS or Object Relational Data Schema (ORDS), as is known in the art.

With reference to FIG. 1, the NewsRoom Repository 110 in this example contains millions of documents per year from thousands of independent news sources. Table 1 below shows a representative collection of documents for use in NewRoom Repository 110. For example, the news sources may include traditional news sources, e.g., national and local newspapers, periodic journals, radio program transcriptions, as well as non-traditional sources such as blogs, analyst reports, industry reports and potentially any news-bearing content available for collection and processing. Thomson Reuters has long made comparably large news collections available for external research: http://trec.nist.gov/data/reuters/reuters.html. During the stage 1 data set creation process the SCE 119 performs an extraction process 124 and populates database tables with document data and metadata tags—tags and other metadata may be the result of this or another pre-clustering process, for example Calais tagging. In this manner, documents may be more rapidly processed based on metadata and/or tags rather than the content as a whole. In addition, by understanding metadata, such as may be provided by third-party sources or as based on Calais tagging engine performed on third-party data, the SCE 119 can include documents for which the NewsRoom 110 does not possess all content but rather excerpts or tag information. Even with internal document sources 112, the SCE 119 may use structured document information rather than all content to expedite processing and conserve computational resources.

TABLE 1

| NewsRoom Integrated Data Sources | | |
|---|---|---|
| YEAR | SOURCES | DOCUMENT COUNT |
| 2012 | Reuters/Diverse | 14.6M |
| 2013 | " | 20.3M |
| 2014 | " | 27.8M |
| 2015 | " | 20.0M |
| 2016 (est.) | " | 20.5M |
| TOTAL | " | 103.2M |

To test the news workflow and the clustering algorithms of the SCE 119 that support it, the inventors typically focused on chunks of data representing up to approximately three months of documents at a time, i.e., in the 1.0M-5M document range. Based on prior investigated baseline news clusters in earlier research efforts (i.e., baseline algorithm, its granularity, speed and complexity) the inventors pursued improvements and efficiencies to help approach objectives more effectively.

In one exemplary implementation, the SCE 119 represents a hybrid of semi-supervised clustering techniques and human-generated (SME) and labeled data to deliver an effective solution produced by leveraging existing tags or event labels and, in this example, Thomson Reuters News-Plus and Agency building blocks. Third-party content 114 is gathered and organized, along with internal content 112, around "seed" documents—i.e., content based on Thomson Reuters' SME editorially labeled and classified news events, e.g., sluglines, referred to generally as "event labels." In this manner the SCE 119 uses a human-tagged event label, e.g., slugline, with algorithmic clustering to deliver Events-based searching/retrieval/alerting/delivery across a universe of aggregated news.

Two exemplary manners of operation of the NEC-RS include: 1) preparing and maintaining a database of pre-clustered and event-tagged documents available for accessing upon receiving an input retrieval expression, such as a user query, and 2) performing an incremental update to update a database of pre-clustered documents to include documents not previously included in the database of pre-clustered documents. The NEC-RS performs the task of clustering documents about a SME defined event and into the same result set (cluster), thus creating a transformative new delivery paradigm, one that is news event-centric rather than document centric. The second, pre-clustered manner of implementation has the advantage of being able to call an existing clustered set of records without having to execute the three-stage clustering process contemporaneously with receiving a user query. This is more time-efficient and leads to a faster delivery of desired news event clustered documents. In operation, "batch" aggregate clustering could occur offline and periodically—either initially for new event labels/seed documents associated with a new event, or updated with periodic maintenance clustering to add to or revise the existing pre-aggregated cluster set. For example, the NEC-RS may run every #N time intervals and not each time a user enters a query. As a further alternative, the NEC-RS may update an existing clustered set about a news event to render a temporally most-recent cluster set to take into account new documents received after the last #N interval (e.g., two hours) batch run. In addition, all internal documents having a common event label, for example, could automatically be included in the existing batch aggregate cluster set separate from an #N interval batch run. Steps may be employed to guard against duplication or unintended recycling of event labels.

In addition, the NEC-RS may be tailored to meet particular industry needs and to deliver responsive information in a format directed to address concerns associated with the industry or customer. For example, event presentation in news may be structured to align with business-specific delivery mechanisms and platforms. In Thomson Reuters Finance and Risk business (Eikon platform), events are fundamental to risk detection, monitoring and modeling. In the context of Thomson Reuters Agency business, Event-based news delivery provides competitive differentiation on customer functionality.

Now with reference to the method and process described in FIG. 3B, the computer-based NEC-RS system is connected via a communications network to a plurality of news content sources and is configured to execute the functions of process 300. At block 302, a news repository database receives or accesses a primary set of documents and a secondary set of documents. Each of the primary set of documents is assigned a predefined event label. The event label is preferably assigned by a subject matter expert operating in the NEC-RS environment, such as via a digital communications interface having an input and an output, the input adapted to retrieve information from the news repository database and receive a retrieval query. The event label is assigned based on a recognized topic of interest contained in the primary document textual content. With reference to block 304, an event clustering engine clusters documents about an event and is more particularly configured to execute the blocks 306-310. Block 306 represents a first stage in the clustering process wherein a data set creation module loads a set of documents for potential news event clustering into a candidate data set. The candidate data set includes documents from both the primary set of documents and the secondary set of documents. Block 308 represents a second stage of the clustering process wherein, in one manner of operation, an initial cluster module compares digital signature metadata related to the candidate data set and clusters a set of documents from the candidate data set to form an initial cluster. The initial cluster is designed to efficiently group together like documents, i.e., identical or nearly identical documents. The initial cluster module executes at block 308 to form a plurality of initial clusters. Block 310 represents the third stage of the clustering process wherein an aggregate cluster module executes an algorithmic similarity function to measure similarity between features related to initial clusters formed by the local cluster module in stage 2 at block 308. Based on measured similarity, the aggregate cluster module merges one or more initial clusters to form an aggregate cluster about a seed document from the primary set of documents.

In addition, the clustering process of the invention may be used in connection with an information retrieval process. For example, block 312 includes a retrieval engine comprising: an event identification module adapted to identify an event of interest related to a received retrieval query; and a match module adapted to match the identified event of interest with one or more aggregate clusters. The output of the digital communications interface is adapted to output for display at a computing device a representation of an aggregated cluster in response to a received retrieval expression, such as a query.

Figure 4:
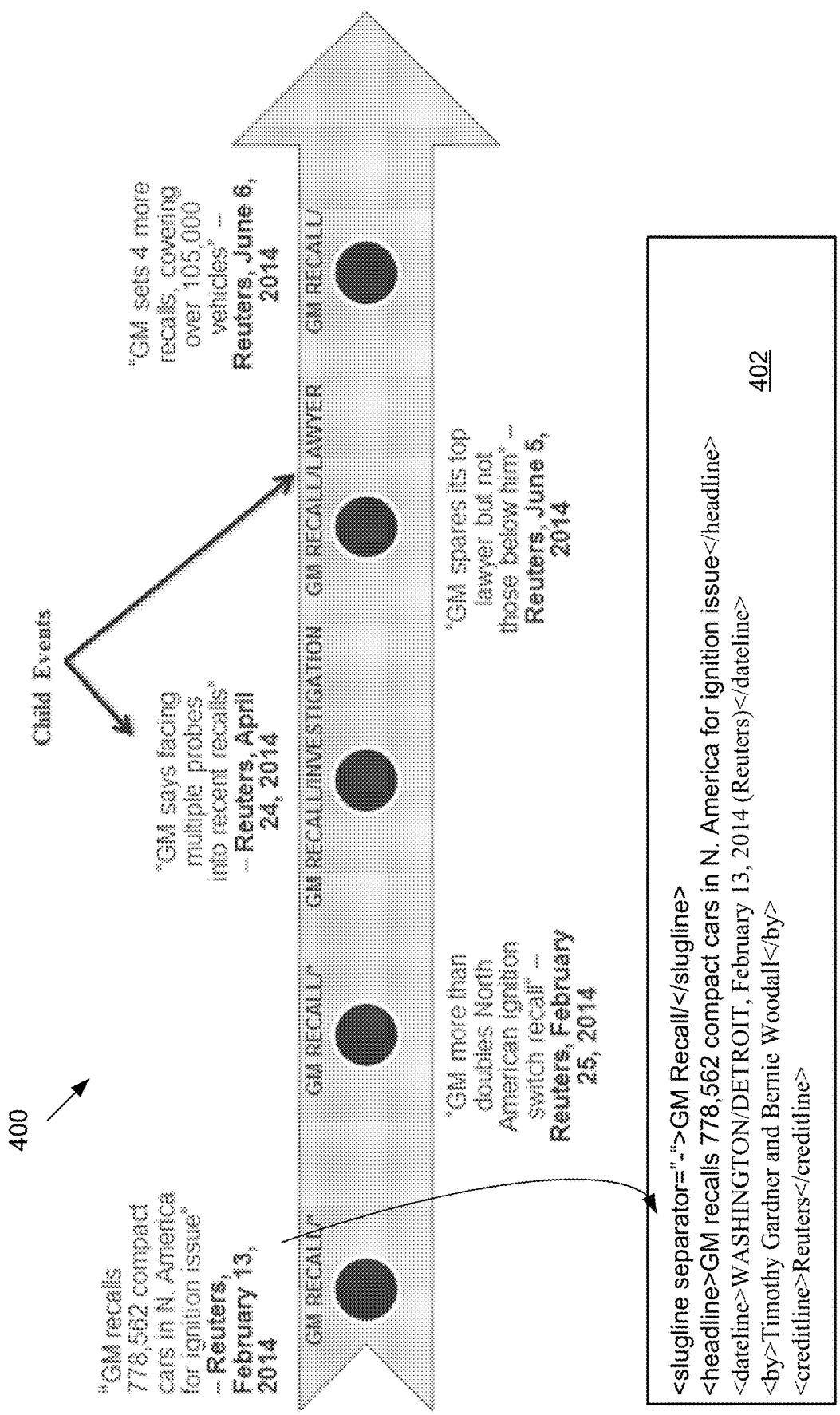
FIG. 4 is a flow chart illustrating an exemplary news article progression including use of event labels assigned to articles for use in the clustering process of the NEC-RS of the present invention.

Now with reference to FIG. 4, an exemplary scenario 400 is shown involving the "General Motors Recall" for faulty ignition switches. Over a period of time a series of articles are written concerning the "GM Recall" event. Although not necessarily the first published article concerning an event, a Company operating a NEC-RS system generates or publishes a germinal (seed) article that includes as metadata a SME-assigned event label—in this example the event label assigned to the seminal "seed" article is "GM RECALL" referenced at 402. Other stories are subsequently published and may be clustered together around the news event "GM RECALL" or, moreover, a sub-cluster inheriting a second tier event label, e.g., "GM RECALL/LAWYERS. Third-party articles are assigned metadata topical labels (tags) by the Calais tagging engine. Through this process, the NEC-RS adds structure to third-party articles, in a similar fashion to internal company, e.g., Reuters, articles. Once processed, such third-party documents may then be clustered together with the original cluster, which may be algorithmically rebalanced and broken out into sub-clusters, e.g., stories within stories or more granular sub-events.

For example, during the Stage 1 Content Data Set creation stage, unstructured internal documents as well as third-party content, i.e., articles or content not internal to the Company and available by external sources are preprocessed, e.g., digital signatures, recommendation/screening (discussed below), etc. The internal documents at this stage may include internal documents with and without an assigned event label as metadata. The preprocessed documents result in a candidate data set available for clustering. Initially, duplicate or nearly duplicate documents may be grouped into initial clusters for subsequent clustering into aggregate clusters using a seed document having an assigned event label related to an SME identified event. In the example of FIG. 4, an SME appends tags, e.g., via a tool using XML markup language, to a seminal article written concerning the GM Recall event. In this example, an XML tag is used to create the slugline/event label "GM Recall." The article is then used as a seed document based on the slugline/event label—GM Recall for subsequent clustering of news content related to the SME identified and labeled event.

Figure 5:
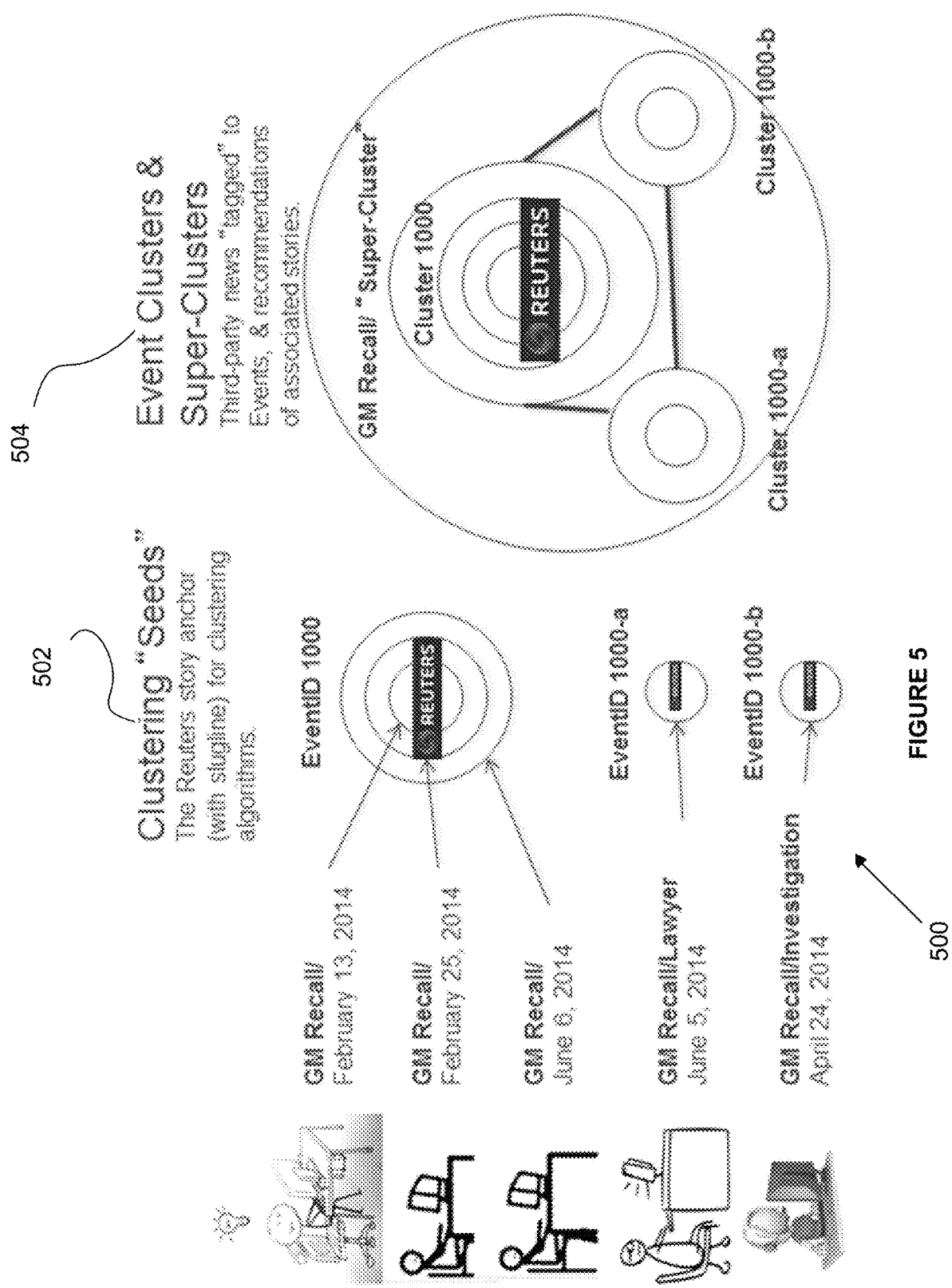
FIG. 5 is a further flow chart illustrating an exemplary news article progression including use of event labels and EventID identifiers assigned to articles for use in the clustering process of the NEC-RS of the present invention.

Now with reference to FIG. 5, an exemplary scenario 500 illustrates the subject matter expert (SME) approach to using online seed content to commence the clustering process and assign and tag defined events with EventID numbers or identifiers. The SME/editorially generated event label (e.g., GM RECALL) newly assigned to a document is responsible for the birth of a seed document from which aggregate clusters will be formed using the clustering process of the present invention. EventIDs or the like may also be assigned relative to a SME generated event label. In an optional manner of operation, an algorithmic identification and population of subsequent sub-clusters may occur and are depicted in FIG. 5. The editorially generated event label provides a subject matter expert ("SME") seed tag and story from which to populate both the initial cluster (stage 2) and to create aggregate or agglomerate clusters (stage 3). Through regular editorial practices, journalists and editors write and tag event-related stories. For a given NEC-RS system and associated provider, the first story published by the provider (shown in the example of FIG. 5 dated Feb. 13, 2014) with the first "GM Recall" event label or tag serves as the seed story for initiating a cluster. Within the NEC-RS an event identification record may be created with an assigned identifier, e.g., "EventID 1000." As Reuters creates and tags more stories about the GM Recall, the set of tags and text defining the GM Recall event expands. In this example, additional articles are published Feb. 25, 2014 and Jun. 6, 2014 that include the initial event label and are associated with the EventID 1000. SMEs assign the event labels and child/other event labels based on the initial event label. Two additional articles are published Jun. 5, 2014, assigned sub-event identifier EventID 1000-a, and Apr. 24, 2014, assigned sub-event identifier EventID 1000-b. As it expands, so too does the algorithm's grasp of the event, helping it to better identify cluster candidates, particularly, documents that have not been assigned event labels. In this example, third-party news document records are "tagged" or assigned the label associated with Event 1000 and/or sub-events 1000-a and 1000-b to form a "super-cluster."

As will be described later, sub-clusters may be generated algorithmically, and these sub-clusters can inherit the two-tier event labels or sluglines that the composite documents possess.

Figure 6:
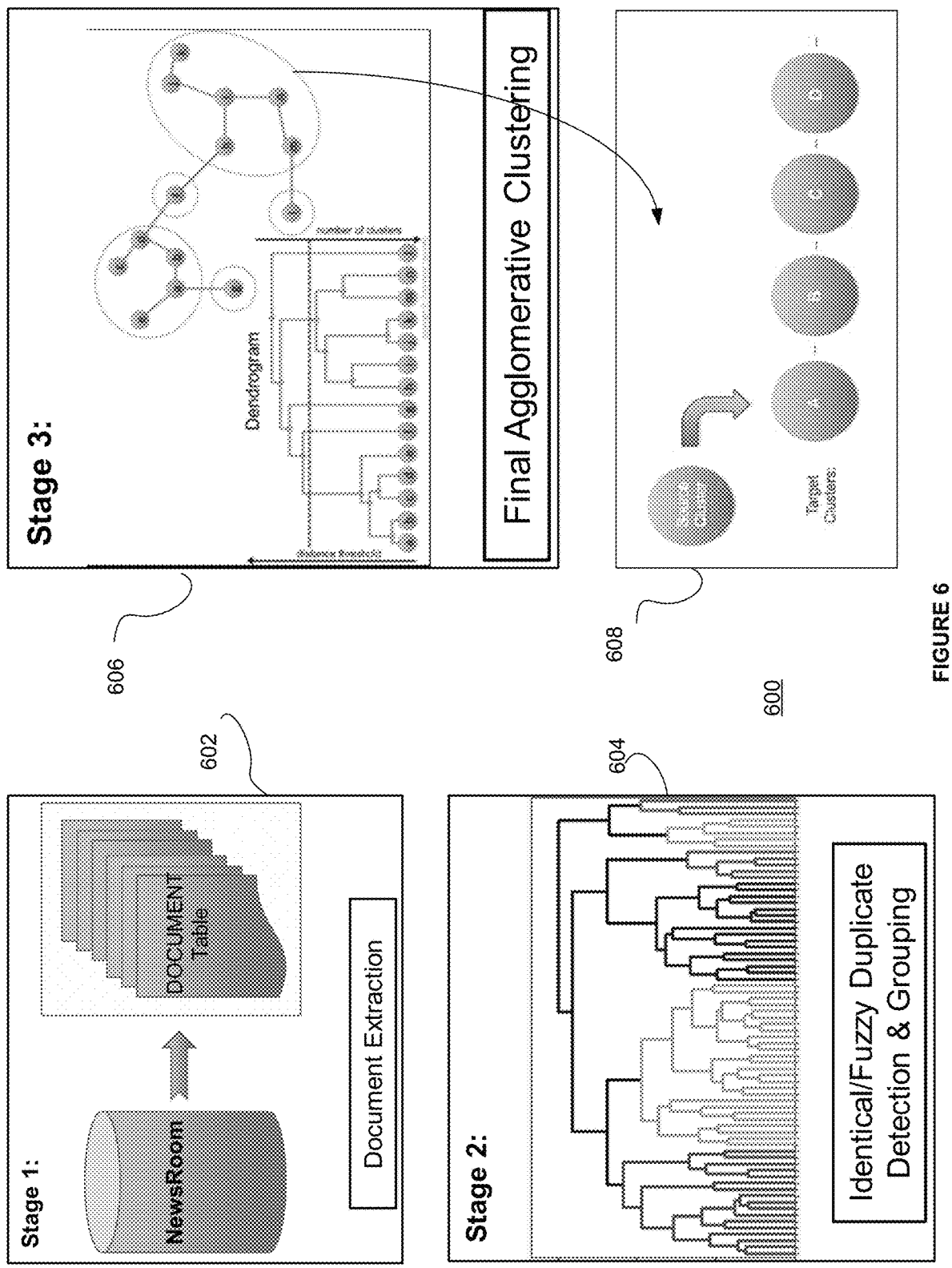
FIG. 6 is a schematic diagram illustrating an exemplary embodiment of the three-stage clustering process in accordance with the NEC-RS of the present invention.

In the exemplary implementation of the present invention as described herein, there are three stages involved in processing and clustering a large set of news documents around news events. These stages include: (1) preprocessing by way of extracting the documents from a news repository; (2) performing "online" or local clustering which starts with a seed article having a known tag or event label and initially grouping similar articles based in part on screening using duplicate document identification for identical and fuzzy duplicates; and (3) executing "batch" or aggregate clustering over the resulting data set produced by the second stage (as illustrated in FIG. 6). Based on experimental testing the inventors have verified that the online clustering stage is effective and reliable. See articles cited above as support for efficacy. The aggregate clustering stage as described herein is by itself a significant advancement over the art. Moreover, the aggregate stage is the third of three-stages and is preceded by stage 1 (extraction/content set creation) and stage 2 (initial clustering). Together the three stages represent significant advancement of the art in providing an alternative event-centric framework for delivering clustered news documents about an event of interest.

With respect to the first "document preprocessing" stage 1 of the seeded clustering solution, the document extraction process can be customized and may involve one or more known approaches. For example, Thomson Reuters NewsRoom represents a news repository of both Reuters and non-Reuters sources covering roughly 12,000 news sources. The NewsRoom environment comes with a recommendation classifier. Given two time stamps, e.g., [20141001T0000000Z 20141231T235959Z], one can extract all of the "recommendable" news documents in the repository within that time range, or some user-defined sub-set of them. Since the repository contains substantial numbers of Reuters and non-Reuters financial and other documents, for example, some stories are largely non-textual, e.g., containing tabular information only; very short, e.g., stubs for in-progress stories; or meta-data snippets for topics that were not substantiated. These types of documents are considered "non-recommendable" and thus are not retrieved for subsequent processing and potential clustering.

In one manner of operation, the extraction process results in all specified recommendable documents being loaded from the repository to a working database, e.g., an Apache Derby JDBC relational database. The tabular data structures that store the documents and subsequent clusters contain basic information such as doc id, dataset name, doc date, title, article source, source URL (if applicable), body, body length, together with tens of additional features that can be used to discriminate and be used by various classifiers, e.g., primary news code, short sentence count, ticker count, quantity of numbers, quantity of all-caps, quantity of press releases, etc. These additional features are available for subsequent downstream processing such as classification, routing or clustering. The importance of the first stage is to use a known preprocessing approach and to avoid unnecessary use of computational resources for later Stages 2 and 3. Further particulars concerning the preprocessing stage are not critical to the invention.

In the context of the second "initial clustering" stage, this stage provides rapid and efficient identification of initial clusters based on documents from Stage 1 that have criteria for identical or fuzzy duplicates. In one respect, this may be considered a "local" clustering stage in that the documents are clustered based on proximity to each other as a result of duplicate or near-duplicate status. For example, and not by way of limitation, preprocessed documents from Stage 1 are compared using two types of digital signatures that harness the most discriminating terms, one, smaller and more compact leveraging O(10) terms, is used to identify identical duplicates; another, more expansive, leveraging O(100) terms, is used to identify fuzzy duplicates. For this application, a rolling window of "n" days is used, where n is generally on the order of 30 or roughly one month (note that when using the digital signature technique in connection with stage 3 aggregate clustering the window may be different, e.g., smaller, such as n<10). Documents falling within this window are compared. Heuristics relying on features such as document length, are also invoked to reduce the number of comparisons required. For example, when a document exceeds the length of another by 20% or more, though they may satisfy a "containment" relationship, they would not be considered "duplicates" based on this exemplary criteria, such as the processes described in U.S. Pat. No. 7,809,695.

The initial event label may be separated out into a top-level or "top-level core event label" and second level or "lower-level subsidiary event label" and resulting cluster sets. In addition, there may be further grades or levels of event labels, third-level, fourth-level, etc.

In the context of the third "aggregate clustering" stage, also referred to as the aggregate (or in certain instances "batch") clustering stage, two challenges are confronted. First, finding the best set of features and metrics for deciding whether two initial (Stage 2) clusters justify merging into larger clusters while remaining sufficiently cohesive, and, second, identifying the optimal sequence for comparing initial clusters when considering merging. The NEC-RS uses a News Event Clustering engine ("NEC") to simplify clustering of documents. For example, when users search for documents of interest about an event that is the focus of a search and associated query that may be input in connection with a search engine. Instead of running an exhaustive series of document-centric queries that return lists of news articles, the NEC allows users to perform event-centric searches/queries and returns clusters of pre-assembled document sets that are structured around the news event and its sub-topics of interest. The NEC-RS organizes information retrieval around the typical time-based evolution of a news event including developing sub-events or separate events that occur arising out of the initial event of interest. By providing a user interface representing an event-centric cluster the NEC-RS delivers information in a much more useful and organized manner in contrast to a simple list of responsive documents yielded by traditional document-centric retrieval systems.

One exemplary environment for implementing the NEC-RS is the Thomson Reuters Eikon service/solution that supports professionals in the Financial and Risk area. In one exemplary use of the present invention, a user interested in obtaining news/information related to an event of interest can set up using his/her account/profile an alert function to receive breaking news related to the event outside the context of a real-time search. The Eikon messenger service can automatically push or forward links or excerpts or summaries of breaking news concerning the subject event of the alert.

In one embodiment of the News Event Clustering and Retrieval System the feature set used as a basis for determining whether to merge two clusters consists of two parts: 1) digital signature-based similarity score (applied to the unstructured text)(Equation 2 below); and 2) tag-based (e.g., Calais or other tag platform) similarity score (applied to the Calais or other tagger-structured text)(Equations 3 and 4 below).

In one exemplary formulaic expression, digital signature-based similarity scoring is expressed as:

$$\text{Sim}_{digSig}(a,b) = a \cdot b. \quad\quad\quad (Eq.\ 2)$$

With reference to digital signature-based similarity scoring, the inventors leveraged the digital signature feature associated with earlier duplicate identification research and resulting U.S. Pat. No. 7,809,695 (Conrad et al) to arrive at the digital signature-based scoring solution. In this approach, the digital signature for a document is arrived at by capturing the topical nature of the article's unstructured text. Empirical findings resulting from this approach indicated that comparing digital signatures is a reliable way of comparing and measuring the degree of overlap of discriminating concepts between two documents. One key difference between use of the digital signature feature in the three-stage clustering system of the present invention and use of the digital signature feature as described in the earlier patent for duplicate document identification is that the threshold used in the current application may be set appreciably lower for clustering purposes. Whereas the similarity threshold is a relatively high 0.8 (80%) for the fuzzy duplicate detection application of the earlier patent, it may be lower when in the present clustering system, e.g., in the range of 0.5.

In the exemplary formulaic expression of Equation 3, tag-based similarity scoring is a set of vectors based on an assortment of tags. In this example, tags include Calais tags present in the two initial clusters' documents (RICs, people, topics, RCS codes, Smart Terms, etc.). The algorithm is expressed as the weighted sum of the dot products of the pairs of vectors (topic, people, RIC code, RCS code, and smartTerm) in Equation 3 below:

$$\text{Score}_{metaMatch} = c_{ts}\text{Sim}_{topic} + c_{ps}\text{Sim}_{people} + c_{rics}\text{Sim}_{ric} + c_{ress}\text{Sim}_{rcs} + c_{sTs}\text{Sim}_{smartTerm}. \quad (Eq.\ 3)$$

In one exemplary solution in which the sum of coefficients $c_{terms}$ equals 1.0, the tag-based similarity score is expressed as:

$$\text{Score}_{metaMatch} = 0.3\text{Sim}_{topic} + 0.15\text{Sim}_{people} + 0.15\text{Sim}_{ric} + 0.2\text{Sim}_{rcs} + 0.2\text{Sim}_{smartTerm}. \quad (Eq.\ 4)$$

Additional information related to tagging is provided at the following readily available resources:
  https://en.wikipedia.org/wiki/Reuters_Instrument_Code; and
  http://www.opencalais.com/wp-content/uploads/2015/06/Thomson-Reuters-Open-Calais-Upgrade-Guide-v3.pdf.

Thomson Reuter's Calais may be used to assign topic, people, RIC, RCS and smartTerm tags.

In addition, a further improvement over the prior digital signature application for use in the NEC-RS involves using a HashMap to store similarity scores between the digital signatures to avoid computationally costly repeated lookups. Still further as improvement over the prior digital signature application, advantages are realized in identifying an effective means of representing the quality of textual similarity between two clusters when relying on digital signature overlap (highest score, mean score, median score, modal score, etc.) or construct a true cluster centroid for each cluster, one that is composed of the terms represented in each document's digital signature.

Although the embodiment is described in terms of particular formulaic expressions of feature sets, the invention is not limited to these particular expressions and users may find other feature sets to use in connection with the aggregate clustering Stage 3 process.

For example, and as an alternative approach, the NEC-RS may employ a feature set expressed as the degree of overlap of the n-grams produced from each of the two document sets. However, testing this approach has revealed the n-gram overlap component, at least in the scenarios examined, had little positive contribution to the similarity assessment executed between two clusters, even when its positive threshold was set low, e.g., 0.1 to 0.2 on a scale from 0 to 1. This result is not totally unexpected since n-grams in and of themselves contain no measure of the discriminating nature of the terms contained in the n-gram. The n used in these n-grams was on the order of 2 or 3.

As important as these types of comparison are between documents or clusters, so too is how to represent and aggregate the comparisons made across the documents present in the pair of clusters being compared (highest score, mean, median, mode, etc.) or between their centroid representations. In one version used for evaluating the efficacy of the invention, a centroid was used to represent the cluster that consisted of the longest document in the cluster. The motivation for such a representation was two-fold. First, using a single centroid document for inter-cluster comparisons simplifies the number of computations made for making similarity measurements, and secondly, the longest document tends to possess the largest coverage of the topic or sub-topic contained in the cluster.

One additional system design consideration addresses the optimal means of combining document overlap and tagged entity overlap (i.e., the combination of the tag-based similarity scoring approach of Equation (2) with the digital signature feature similarity scoring approach of Equation (4)). The News Event Clustering Retrieval System NEC-RS can employ either a weighted sum of the two components or can use two separate thresholds, whereby when either of the thresholds is exceeded, a positive determination is made concerning merging the documents/clusters under consideration.

With reference to FIG. 6, Stage 1, referenced at 602, involves a Candidate Data Set Creation process including document extraction from the NewsRoom Repository. In one exemplary manner, the candidate document data set may be stored in a data set or table "Document Table" for subsequent processing. Stage 2, referenced at 604, involves an initial clustering process for clustering documents from the candidate data set of Stage 1 into initial clusters, which may be stored in an initial cluster data set or table. Digital signatures and other features may be used to identify duplicates or near duplicates (fuzzy duplicates) as a way to efficiently and effectively group together similar documents for use in the aggregate clustering stage. Stage 3, referenced at 606, involves the final aggregate or agglomerative clustering process and results in aggregate clusters, which may be stored in an aggregate cluster data set or table. Here, initial clusters are considered for clustering about a "seed" document having an event label assigned to it. The seed document is a primary or internal document that was included in the NewsRoom Repository having an event label assigned to it by an SME and provides a way to cluster documents in an event-centric fashion about a document known to relate to an event of interest.

With continuing reference to FIG. 6, cluster candidates are chosen for merging during the aggregate clustering process of Stage 3 (606). As used herein, a cluster, refers to a set of one or more topically similar documents. Merging may include comparing initial seed clusters (clusters consisting of a seed document containing an Event Label and zero or more other documents) with other clusters to determine their similarity and whether criteria for merging is met. This similarity measurement may include first comparing digital signatures generated from the unstructured text of documents and second, comparing tags, such as those provided by the Calais tagging engine or the like. The aggregate clustering process may involve establishing a "source queue" of seed clusters and a respective "target queue" of initial clusters for determining which target clusters merit merging with the seed clusters in the source queue. The NEC-RS may compare target clusters with source seed clusters based on measured similarity.

In an environment consisting of tractable numbers of documents and their associated clusters, generally less than $O(1K)$ clusters, it is possible to produce an optimal merging sequence using a procedure such as Ward's minimum variance criterion. [cf: https://en.wikipedia.org/wiki/Ward's_method] Ward's minimum variance method is a special case of the objective function approach presented by Ward wherein, for the agglomerative hierarchical clustering procedure, the criteria for selecting the pair of clusters to merge at each step is based on the optimal value of the objective function. In the case of the News Events Clustering—Retrieval System use case, the criterion might be the two clusters that have the highest value from one of the similarity functions. In operating a merge strategy based on such a criterion, it would be possible to achieve an optimal sequence of merges until the similarity measurements no longer meet our established thresholds. Where scalability is not an issue, Ward's method is the best approach to cluster merging.

When scalability is an issue, for example, when one is managing $O(10K)$ to $O(100K)$ clusters, as in the case of news repositories with tens of millions of news articles as depicted in Table 1, one needs to consider alternative, more computationally efficient approaches to merging. The news article repository and the NEC-RS system represent such a use case. In order to reduce the scope of the candidate clusters under consideration, one can introduce heuristics to limit the number of eligible candidates. In a repository like that presented in Table 1, one can introduce a heuristic that uses a time-bounding principle. For example, in a document repository that spans years, one may observe that it is highly unlikely that current articles would cover events written about in articles from years or many months earlier. And if they did, those articles would likely already be included in clusters containing other articles produced later in time than the seed or initial articles in the cluster. The operative heuristic would thus be to compare clusters that are within, for example, n days of each other, where n would be in the range of 90, 60 or even 30 days (the latter time frame mentioned earlier). The effect of such a heuristic is to greatly reduce the computational complexity of the merging operation.

In the interest of further computational efficiencies, we have explored other straightforward and effective approaches to merging used in combination with time-bounding. In one exemplary embodiment, a Least Recently Used (LRU) queuing approach is used in combination with time-bounding, represented by reference number 608. The idea behind the LRU algorithm is to maximize coverage among the eligible candidate target clusters in the cluster space by considering those clusters visited least recently. The LRU algorithm is used to address the design consideration stated as: given a candidate cluster (from the initial clustering stage 2), what should be the order of the clusters in the queue to compare with first? Although the NEC-RS may employ the LRU clustering technique, it is not the only approach and does not guarantee optimal merging like the Ward technique. If the candidate cluster is as shown, and the distance between the source and target clusters meets the minimum similarity requirement, then the candidate target is merged with the source cluster. There is a linear scan property of the algorithm that is sub-optimal, insofar as target cluster A may be merged with the source cluster even though cluster farther back in the queue, e.g., D, may have a higher similarity score with the source. Accordingly, such limitations may be addressed with further queuing adjustments and enhancements but are not essential to the use and enjoyment of the NEC-RS system.

The LRU algorithm is a useful, however limited, technique to address the need to merge similar clusters—using the rationale that it makes sense to consider as next candidates for merging those within the time-bound space that have least recently been considered for such an operation. This approach tends to offer broad coverage and avoid the inherent bias associated with the alternative Most Recently Used (MRU) algorithm that stems from considering only candidates in the same vicinity of the news document space within the pool of target clusters. In addition to simple examples like LRU and MRU approaches, variations are available that effectively represent a hybrid of simple algorithms and Ward-like methods described above. The NEC-RS may consider, for instance, a series of candidate target clusters in the queue, e.g., A through J [the next 10 candidates, or, moreover, the next n candidates, where n is $O(100)$] for their similarity to the current source cluster. By using measures such as the dot product of the cluster centroids consisting of digital signature terms (described in detail elsewhere herein), the NEC-RS can achieve efficiencies that permit comparing a set of clusters in the same processing step, as opposed to comparing one simple candidate at a time, e.g., from the LRU or MRU queues. Furthermore, by profiling particular centroids being compared and the names of their common features, the NEC-RS may identify efficiencies that further enable a more economical comparison of a source cluster and the remaining set of target clusters. The point is that LRU and MRU are only simple extremes, and there are other worthy though more complex approaches that fall between the two extremes or may be combined with other Ward-like techniques. The invention should thus not be limited by the mention of such simple. time-bound techniques. These are simple illustrations that can be replaced by more sophisticated and hybrid techniques to produce effective aggregate cluster merging.

Through testing, the inventors have empirically shown that using an MRU algorithm outperforms a LRU algorithm in terms of computational efficiency and better resulting clusters. This outcome makes intuitive sense insofar as clusters that have most recently been expanded with current documents possess the promise of containing information relevant to the next in line and next recently created or treated clusters.

A further extension of the present invention involves a semi-supervised learning process to evaluate accuracy of clusters and to fine tune the algorithmic processes of stage 3. For example, a group of subject matter experts may be provided with result sets after processing of the NEC-RS a news data set and yielding numerous clusters on the subject of a set of events. Some of which may be on the topic of a given news event some of which may not be on that topic. For those that were on the subject of the event, the clusters basically represented sub-topical (second tier) clusters. Metrics that the SME evaluators use may be two-fold. First, the SME evaluators score each cluster for coherence and accuracy, making sure that all of the documents that belong to a specific cluster are present, and that all of the documents that don't belong are not present. For this task, a five-point Likert scale, A-thru-F, codified as 5-to-1, may be used. Second, the SME evaluators determine a "cluster edit distance" for each cluster solution, indicating which sub-clusters they would merge and which they would split to achieve a more desirable solution. Each merge or split step would be the cluster equivalent of an "edit" in the standard character-based edit distance measure. After this evaluation process the algorithmic functions employed in the batch clustering stage 3 may be adjusted to further refine the NEC-RS operation and improve results over time. In addition, a training data set and training module may be used to automatically train the algorithmic processes of stage 3 with established training data. See, Jack G. Conrad and Michael Bender, "Semi-Supervised Events Clustering in News Retrieval," In M. Martinez, U. Kruschwitz, G. Kazai, D. Corney, F. Hopfgartner, R. Campos and D. Albakour (eds.): *Proceedings of the First International Workshop on Recent Trends in News Retrieval (NewsIR'16)*, in conjunction with ECIR 2016 (Padua, Italy), CEUR-WS Online, pp. 21-26, 2016.

Figure 7:
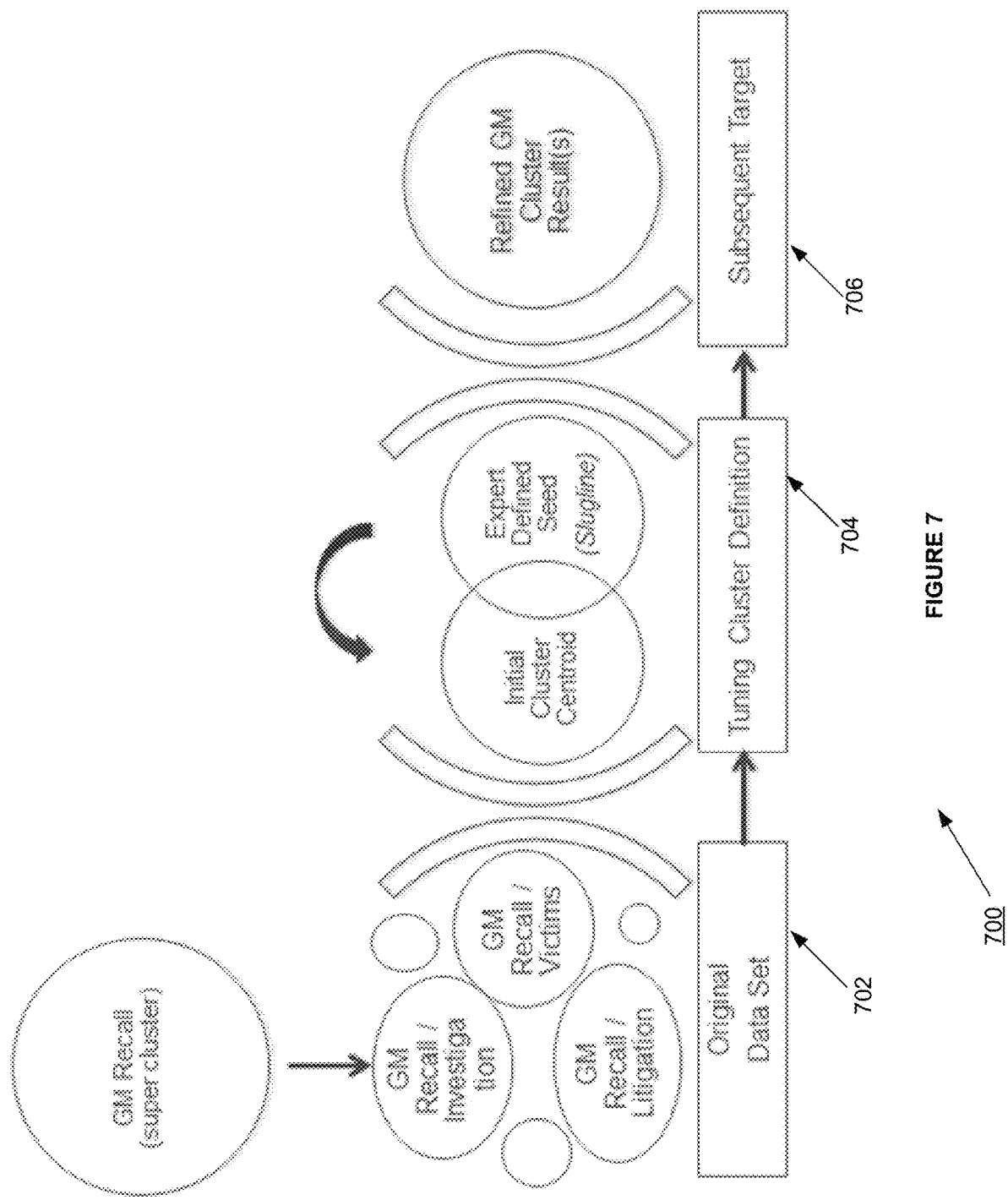
FIG. 7 is a flow chart illustrating an exemplary cluster merge process in accordance with the clustering process of the NEC-RS of the present invention.

Now with reference to FIG. 7, a further illustration of the clustering process 700 associated with the NEC-RS is shown in which an initial top-level or "super" cluster comprising an original data set 702 is refined through a tuning cluster definition stage 704. The tuning cluster definition stage involves a SME seeded event based on a tagged event label and an initial cluster centroid. The tuning cluster is then further processed as a subsequent target and into a refined cluster result 706.

Figure 8:
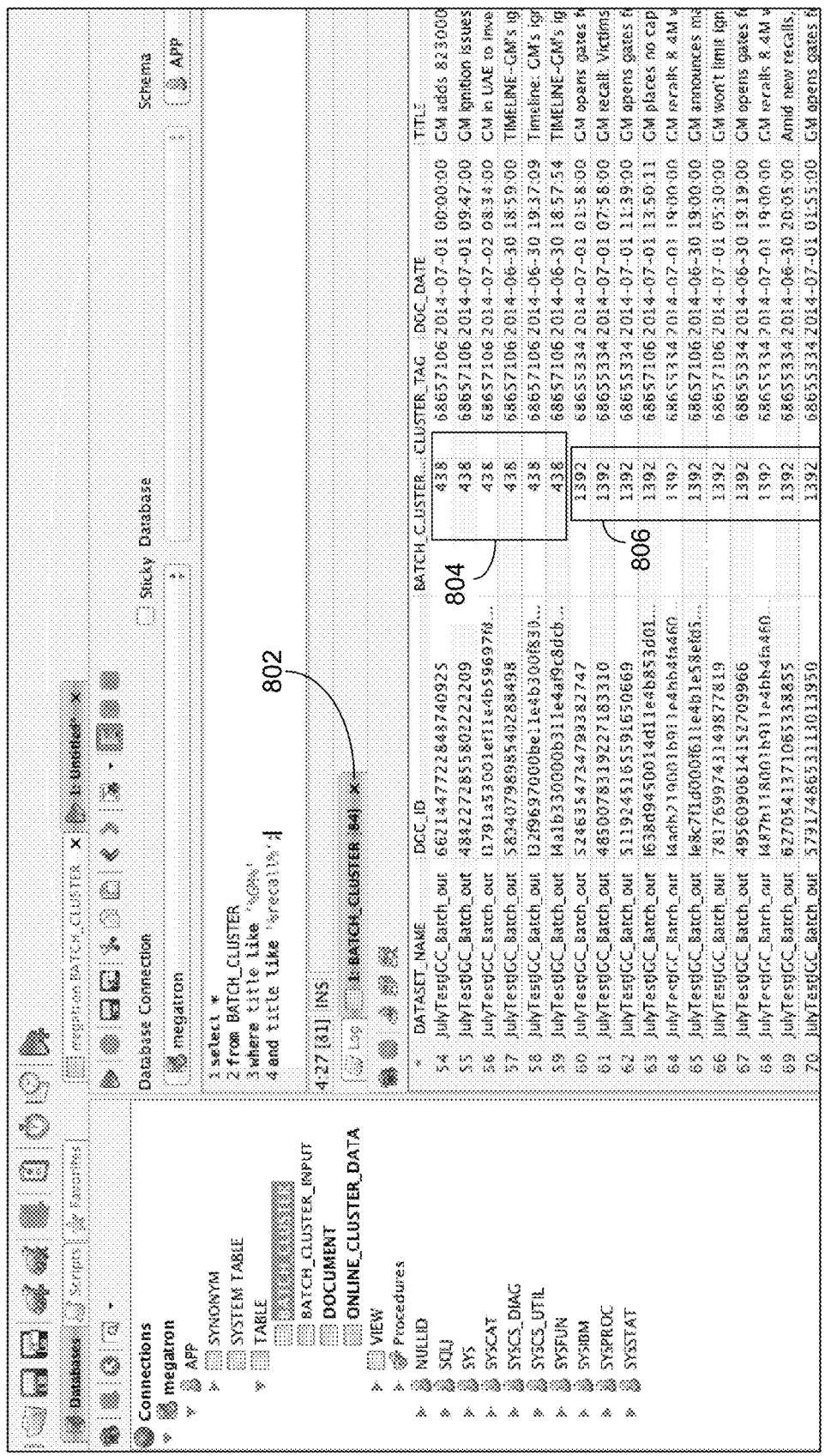
FIG. 8 is a screen shot illustrating an exemplary data set clustering related to an aggregate (batch) cluster stage associated with the NEC-RS of the present invention.

Now with reference to FIG. 8, an exemplary final cluster report 800 is shown comprising two aggregated clusters 804 and 806, having respective cluster IDs 438 and 1392. Each document resulting and placed in the respective clusters is shown having a unique document ID "DOC ID" and cluster tag. Criteria associated with this exemplary report is shown as "where title like 'GM' and title like 'recalls.'"

In tailoring approaches to improve overall performance, one way of addressing some of the disparities in strategies used is by tuning the joint thresholds for document signature and named entities/events tagged. Alternatively, one could have the thresholds learned and optimized depending on features associated with the documents (e.g., range of idfs in the signatures, number and type of entities in the document). Moreover, one could use a variable weighted sum of the similarity scores, depending on the contribution of the named entities and distinguishing terms present in the articles being compared. All of these and other approaches are fully within and contemplated in the present invention.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-based system connected via a communications network to a plurality of news content sources, the system comprising:
   a news repository database comprising a primary set of documents and a secondary set of documents, each of the primary set of documents having a story line feature and an assigned and predefined event label;
   a digital communications interface having an input and an output, the input adapted to retrieve information from the news repository database and receive an input retrieval expression;
   an event clustering engine adapted to cluster documents about an event and comprising:
      a data set creation module adapted to load a set of documents for potential news event clustering into a candidate data set, the candidate data set including documents from both the primary set of documents and the secondary set of documents;
      an initial cluster module adapted to generate digital signature metadata for each document in the set of documents, the digital signature metadata being separate from each document in the set of documents and comprising a data structure including an assigned event label representing a document topical nature derived from unstructured text for each document in the set of documents for the candidate data set, wherein the event label is a document feature stored in the data structure;
      the initial cluster module adapted to compare the digital signature metadata related to the candidate data set and 1) to identify and remove duplicate documents and 2) to cluster a set of documents from the candidate data set to form an initial cluster, the initial cluster module adapted to form a plurality of initial clusters, wherein each initial cluster is formed based at least in part on matching document event labels; and
      an aggregate cluster module adapted to execute an algorithmic similarity function to measure similarity between features related to initial clusters formed by the initial cluster module, the features including the event label feature, the aggregate cluster module further adapted to merge in whole or in part one or more initial clusters to form an aggregate cluster about a seed document from the primary set of documents based on measured similarity, wherein merging initial clusters to form the aggregate cluster is based at least in part on a similarity between an event label tagged to the seed document and one or more features associated with the initial clusters; and
   a retrieval engine comprising:
      an event identification module adapted to identify an event of interest related to a received input retrieval expression; and
      a match module adapted to match the identified event of interest with one or more aggregate clusters;
   wherein the output of the digital communications interface is adapted to output for display at a computing device a representation of an aggregated cluster in response to the received input retrieval expression.

2. The system of claim 1 further comprising a graphic user interface adapted to present a graphic representation of the aggregated cluster set of documents via a display associated with the computing device.

3. The system of claim 1, wherein the data set creation module comprises a recommendation classifier adapted to discriminate among documents to arrive at the candidate data set based on a set of criteria.

4. The system of claim 1, wherein the aggregate cluster module is further adapted to execute an algorithmic similarity function to measure similarity between a set of digital signatures.

5. The system of claim 1, wherein the initial clustering module is adapted to apply heuristic processes based on a set of features to first reduce the number of digital signatures compared in arriving at the initial cluster of document records.

6. The system of claim 1 wherein the data set creation module is further adapted to populate a candidate data set table, the initial cluster module is further adapted to populate an initial cluster table, and the aggregate cluster module is further adapted to populate an aggregate cluster table, wherein the aggregate cluster module applies an algorithm representing a set of document features stored in the initial cluster table to determine merging of initial clusters from the plurality of initial clusters into the aggregate cluster and storing data related to the aggregate cluster into the aggregate cluster table.

7. The system of claim 1 wherein the aggregate cluster module determines merging of clusters from the initial cluster set based on a determined similarity between two or more of: unstructured text contained in content received from the candidate data set; tagged entity names appearing in the candidate data set; and digital signatures derived from unstructured text contained in content from the candidate data set.

8. The system of claim 1 wherein the aggregate cluster module determines merging of clusters by analyzing data structures represented in vector form.

9. The system of claim 8 wherein a first vector representation of a digital signature associated with the unstructured text of a document is term-based and is used to determine a degree of overlap between two document representatives of their clusters and a second vector is tag-based and is associated with the structured text of a document in the cluster and is used to determine a degree of overlap between two document representatives of their clusters.

10. The system of claim 1 wherein the output of the digital communications interface is adapted to output for display at the computing device a graphical representation of an aggregated cluster.

11. A computer-based system connected via a communications network to a plurality of news content sources, the system comprising:
   a news repository database comprising a primary set of documents and a secondary set of documents, each of the primary set of documents having a story line feature and an assigned and predefined event label;
   a digital communications interface having an input and an output, the input adapted to retrieve information from the news repository database;
   an event clustering engine adapted to cluster documents from the news repository database about an event, the event clustering engine comprising:
      a data set creation module adapted to load a set of documents for potential news event clustering into a candidate data set, the candidate data set including documents from both the primary set of documents and the secondary set of documents;
      an initial cluster module adapted to generate digital signature metadata for each document in the set of documents, the digital signature metadata being separate from each document in the set of documents and comprising a data structure including an assigned event label representing a document topical nature derived from unstructured text for each document in the set of documents for the candidate data set, wherein the event label is a document feature stored in the data structure;

the initial cluster module adapted to compare the digital signature metadata related to the candidate data set and 1) to identify and remove duplicate documents and 2) to cluster a set of documents from the candidate data set to form an initial cluster, the initial cluster module adapted to form a plurality of initial clusters, wherein each initial cluster is formed based at least in part on matching document event labels; and an aggregate cluster module adapted to execute an algorithmic similarity function to measure similarity between features related to initial clusters formed by the initial cluster module, the features including the event label feature, the aggregate cluster module further adapted to merge in whole or in part, based on measured similarity, one or more initial clusters to form an aggregate cluster about a seed document from the primary set of documents, wherein merging initial clusters to form the aggregate cluster is based at least in part on a similarity between an event label tagged to the seed document and one or more features associated with the initial clusters; and wherein the output of the digital communications interface is adapted to output a signal related to one or more aggregate clusters.

12. The system of claim 11 further comprising:
a news delivery module adapted to deliver news content to users and comprising:
an event identification module adapted to identify an event of interest based on a set of user criteria; and
a match module adapted to match the identified event of interest with an aggregate cluster;
wherein the output of the digital communications interface is adapted to output for display a representation of an aggregate cluster associated with a match determined by the match module.

13. The system of claim 12 wherein the event identification module is further adapted to identify an event of interest within a set of user criteria associated with a first user account and wherein the output of the digital communications interface is adapted to output for display at a computing device associated with the first user account a representation of an aggregate cluster associated with a match determined by the match module.

14. The system of claim 13 further comprising a search engine adapted to receive a search query from a remote computing device and wherein the event clustering engine is adapted to generate for output to the remote computing device an aggregate cluster generated in part based on an identified event derived from the received search query.

15. The system of claim 14 wherein the output of the digital communications interface is adapted to output for display at the remote computing device a graphical representation of an aggregated cluster.

16. The system of claim 11 wherein the news repository database includes a recommendation classifier adapted to discriminate among document records received from the secondary set of documents to arrive at the candidate data set based on a set of criteria.

17. The system of claim 11, wherein the initial cluster module comprises a duplicate identification module to cluster identical and nearly identical documents and wherein the initial cluster set of documents is determined in part by comparing a set of digital signatures representing the candidate data set.

18. The system of claim 16, wherein heuristic processes are performed based on a set of features to first reduce the number of digital signatures compared in arriving at the plurality of initial clusters.

19. The system of claim 11 wherein the aggregate cluster module applies an algorithm representing a set of document features stored in a clustering database to determine merging of clusters from the plurality of initial clusters into one or more aggregate clusters.

20. The system of claim 18 wherein the aggregate cluster module determines merging of clusters from the initial cluster set based on a determined similarity between two or more of: unstructured text contained in content received from the candidate data set; tagged entity names appearing in the candidate data set; and digital signatures derived from unstructured text contained in content from the candidate data set.

21. The system of claim 19 wherein the aggregate cluster module determines merging of clusters by analyzing data structures represented in vector form.

22. The system of claim 20 wherein a first vector representation of a digital signature associated with the unstructured text of a document is term-based and is used to determine a degree of overlap between two document representatives of their clusters and a second vector is tag-based and is associated with the structured text of a document in the cluster and is used to determine a degree of overlap between two document representatives of their clusters.

* * * * *